US011157676B2

(12) United States Patent
Dantu et al.

(10) Patent No.: US 11,157,676 B2
(45) Date of Patent: Oct. 26, 2021

(54) METHOD FOR ROUTING BOND WIRES IN SYSTEM IN A PACKAGE (SIP) DEVICES

(71) Applicant: OCTAVO SYSTEMS LLC, Sugar Land, TX (US)

(72) Inventors: Neeraj Kumar Reddy Dantu, Sugar Land, TX (US); Masood Murtuza, Sugar Land, TX (US); Gene Alan Frantz, Sugar Land, TX (US)

(73) Assignee: OCTAVO SYSTEMS LLC, Sugar Land, TX (US)

( * ) Notice: Subject to any disclaimer, the term of this patent is extended or adjusted under 35 U.S.C. 154(b) by 0 days.

(21) Appl. No.: 16/335,204

(22) PCT Filed: Sep. 18, 2017

(86) PCT No.: PCT/US2017/052014
§ 371 (c)(1),
(2) Date: Mar. 20, 2019

(87) PCT Pub. No.: WO2018/057454
PCT Pub. Date: Mar. 29, 2018

(65) Prior Publication Data

US 2019/0347378 A1 Nov. 14, 2019

Related U.S. Application Data

(60) Provisional application No. 62/397,090, filed on Sep. 20, 2016.

(51) Int. Cl.
*G06F 30/394* (2020.01)
*G06F 30/327* (2020.01)
(Continued)

(52) U.S. Cl.
CPC .......... *G06F 30/394* (2020.01); *G06F 30/327* (2020.01); *G06F 30/367* (2020.01);
(Continued)

(58) Field of Classification Search
CPC .... G06F 30/394; G06F 30/327; G06F 30/367; G06F 30/392; G06F 30/398;
(Continued)

(56) References Cited

U.S. PATENT DOCUMENTS 4,136,356 A * 1/1979 Kusano .............. H01L 23/5386 257/203
5,157,618 A * 10/1992 Ravindra .......... H03K 19/1735 716/119
(Continued)

OTHER PUBLICATIONS

International Search Report and Written Opinion issued in corresponding International Application No. PCT/US2017/052014, dated Dec. 4, 2017, 9 pages.

*Primary Examiner* — Nha T Nguyen
(74) *Attorney, Agent, or Firm* — Rothwell, Figg, Ernst & Manbeck. P.C.

(57) ABSTRACT

Systems and methods to translate or convert a desired circuit into a database that instructs a place and route or wire bonding machine where on a substrate to place components and also where to place bond wires on the pads of a connection matrix on a substrate. During the assembly process, the pads of the connection matrix are populated with bond wires using the database.

20 Claims, 31 Drawing Sheets

(51) Int. Cl.
*G06F 30/367* (2020.01)
*G06F 30/392* (2020.01)
*G06F 30/398* (2020.01)
*G06F 113/20* (2020.01)
*G06F 115/10* (2020.01)
*G06F 119/06* (2020.01)

(52) U.S. Cl.
CPC .......... *G06F 30/392* (2020.01); *G06F 30/398* (2020.01); *G06F 2113/20* (2020.01); *G06F 2115/10* (2020.01); *G06F 2119/06* (2020.01)

(58) Field of Classification Search
CPC ............. G06F 2113/20; G06F 2115/10; G06F 2119/06; G06F 2113/18; H01L 23/5386; H01L 23/5382; H01L 23/52
See application file for complete search history.

(56) References Cited

U.S. PATENT DOCUMENTS 5,424,248 A * 6/1995 Doi ......................... H01L 23/50 257/E23.02
6,880,145 B1 * 4/2005 Wright .................. G06F 30/392 716/122
7,523,430 B1 * 4/2009 Patel ..................... G06F 30/367 716/115
7,595,655 B2 * 9/2009 Hutchings ........ H03K 19/17736 326/16
7,904,864 B2 * 3/2011 Huynh .................. G06F 30/392 716/122
8,629,548 B1 * 1/2014 Andreev ................... G06F 1/10 257/691
8,640,077 B1 * 1/2014 Groves ................... G06F 30/00 716/136
8,656,333 B1 * 2/2014 Bishop .................... H01L 24/06 716/119
9,465,900 B2 * 10/2016 Jeong .................... G06F 30/392
9,514,262 B2 * 12/2016 Huynh .................. G06F 30/392
9,691,760 B2 * 6/2017 Or-Bach ............. H01L 27/0688
9,881,120 B1 * 1/2018 Ginetti .................. G06F 30/367
9,934,354 B1 * 4/2018 Kukal ..................... G06F 30/39
10,127,344 B2 * 11/2018 Or-Bach ............... G06F 30/392
10,297,586 B2 * 5/2019 Or-Bach ................. H01L 25/18
10,452,803 B2 * 10/2019 Delk ..................... G06F 30/394
2008/0022252 A1 * 1/2008 Tokunaga ............... G06F 30/39 257/693
2008/0288908 A1 * 11/2008 Hart ...................... G06F 30/394 716/137
2009/0001573 A1 * 1/2009 Jirawongsapiwat ......................... H01L 23/49838 257/738
2009/0288056 A1 * 11/2009 Gitchev ................ G06F 30/394 716/126
2010/0199250 A1 * 8/2010 Huynh .................. G06F 30/392 716/120
2010/0199254 A1 * 8/2010 Huynh .................. G06F 1/3203 716/127
2011/0154277 A1 * 6/2011 Ankenbauer ......... G06F 30/394 716/103
2011/0260318 A1 * 10/2011 Eisenstadt ............. G06F 30/392 257/737
2012/0241984 A9 9/2012 Pendse
2014/0103959 A1 * 4/2014 Andreev ........ H03K 19/018585 326/41
2015/0227667 A1 * 8/2015 Liu ...................... H05K 3/0005 174/250

* cited by examiner

520

811

812

813

814

```
NN-Active
0 0.2 .75 .95
0 0.2 1.25 1.45
0 0.2 1.75 1.95
0 0.2 2.25 2.45
0 0.2 2.75 2.75
0 0.2 3.25 3.45
0 0.2 3.75 3.95
0 0.2 4.25 4.45
3.4 3.8 4.95 5.05
3.4 3.8 4.35 4.45
3.4 3.8 3.75 3.85
3.4 3.8 3.15 3.25
3.4 3.8 2.4 2.5
3.4 3.8 1.65 1.75
3.4 3.8 0.9 1
3.4 3.8 0.15 0.25
3.05 3.25 4.5 4.5
3.05 3.25 0.7 0.9
0.45 0.65 0.7 0.9
0.45 0.65 4.3 4.5
3.1 3.2 1 4.2
0.75 2.95 0.75 0.85
0.5 0.6 1 4.2
0.75 2.95 4.35 4.45
NN-Passive
0.2 0.85 0.2 1.6
0.85 1.05 0.4 1.4
1.05 1.15 0.5 1.3
1.3 1.4 0.5 1.3
1.4 1.6 0.4 1.4
1.6 2.26 0.2 1.6
NN-Matrix
0 1.2 0 0.1
0 1.2 0.15 0.25
0 1.2 0.3 0.4
0 1.2 0.45 0.55
```

| DESCRIPTION | PAD NUMBER | a | b | c | d |
|---|---|---|---|---|---|
| −IN | 1 | 34.4000 | 792.000 | 109.400 | 867.000 |
| +IN | 2 | 34.4000 | 33.000 | 109.400 | 108.000 |
| NC | 3 | 461.850 | 33.000 | 536.850 | 108.000 |
| V− | 4 | 692.650 | 54.600 | 767.650 | 129.600 |
| OUT | 5 | 920.400 | 33.000 | 995.400 | 108.000 |
| V+ | 6 | 920.400 | 720.150 | 995.400 | 795.150 |
| NC | 7 | 388.050 | 792.000 | 463.050 | 867.000 |

```
12
Vertex
IN3 I
Net-(C4-Pad2) F
Net-(C4-Pad1) F
OUT2 O
IN2 I
GND P
INI I
VOCM I
Net-(C2-PAD2) F
OUT1 O
Net-(C2-PAD1) F
3P3VSRC P
Components 13
U1 12
R1 2
R2 2
R3 2
R4 2
R5 2
R6 2
C1 2
C2 2
C3 2
C4 2
C5 2
C6 2
Edge
U1
1 Net-(C2-Pad2)
2 VOCM
3 3P3VSRC
4 3P3VSRC
5 3P3VSRC
6 Net-(C2 Pad1)
7 Net-(C4 Pad2)
8 GND
```

```
1  (['C2_1',     'U1_6'],   [2, 1])
2  (['C2_2',     'R1_2'],   [2, 4])
3  (['R1_1',     IN1'],     [1, 2])
4  (['VOCM',     'U1_2'],   [2, 1])
5  (['OUT1',     'R2_2'],   [4, 2])
6  (['R2_1',     'C2_2'],   [1, 8])
7  (['R6_2',     'U1_12'],  [2, 1])
8  (['3P3VSRC',  'U1_3'],   [1, 1])
9  (['3P3VSRC',  'U1_4'],   [2, 1])
10 (['3P3VSRC',  'U1_5'],   [3, 1])
11 (['OUT1',     'R3_2'],   [5, 4])
12 (['R3_1',     'C2_1'],   [2, 3])
13 (['C5_2',     'U1_11'],  [38, 2])
14 (['OUT2',     'R4_2'],   [3, 4])
15 (['R4_1',     'C4_2'],   [1, 40])
16 (['U1_2',     'C1_1'],   [2, 1])
17 (['C4_1',     'U1_12'],  [40, 2])
18 (['OUT2',     'R5_2'],   [2, 4])
19 (['R5_1',     'C4_1'],   [1, 38])
20 (['IN3',      'U1_11'],  [1, 1])
21 (['C4_1',     'R6_2'],   [38, 3])
22 (['R6_1',     'IN2'],    [1, 3])
23 (['GND',      'U1_8'],   [2, 1])
24 (['GND',      'U1_9'],   [3, 1])
25 (['GND',      'U1_10'],  [4, 1])
```

1301

1306 1307 1308 1309

```
63 NN-ASSIGNMENT
64 (C1_1 - M_3)
65 (C1_2 - M_4)
66 (VOCM - M_1)
67 (IN1 - M_2)
68 (IN2 - M_5)
69 (IN3 - M_6)
70 (C6_1 - M_7)
71 (C6_2 - M_8)
72 (R1_1 - M_9)
73 (R1_2 - M10)
74 (R6_2 - M_11)
75 (R6_1 - M_12)
76 (R1_2 - M_10)
77 (3P3VSRC - D_2)
78 (U1_1 - D_9)
79 (U1_2 - D_10)
80 (U1_3 - D_13)
81 (U1_4 - D_15)
82 (U1_5 - D_16)
```

| DESCRIPTION | PAD NUMBER | a | b | c | d |
|---|---|---|---|---|---|
| OUT A | 1 | 21.20 | 1288.50 | 97.20 | 1364.50 |
| −IN A | 2 | 21.20 | 923.65 | 97.20 | 999.65 |
| +IN A | 3 | 21.20 | 533.05 | 97.20 | 609.05 |
| V− | 4 | 31.30 | 172.20 | 107.30 | 248.20 |
| +IN B | 5 | 864.80 | 162.25 | 940.80 | 238.25 |
| −IN B | 6 | 864.80 | 552.65 | 940.80 | 628.65 |
| OUT B | 7 | 864.80 | 897.10 | 940.80 | 973.10 |
| V+ | 8 | 854.70 | 1280.45 | 930.70 | 1356.45 |

FIG. 14C

METHOD FOR ROUTING BOND WIRES IN SYSTEM IN A PACKAGE (SIP) DEVICES

CROSS REFERENCE TO RELATED APPLICATION(S)

This application is a 35 U.S.C. § 371 National Stage of International Patent Application No. PCT/US2017/052014, filed Sep. 18, 2017, designating the United States, which claims the benefit of U.S. Provisional Application No. 62/397,090, which was filed Sep. 20, 2016, the disclosures of which are incorporated herein in their entirety by reference.

TECHNICAL FIELD

This disclosure relates to packaged devices, such as System in a Package devices, including methods and tools for routing bond wires in devices.

BACKGROUND

System-on-a-Chip ("SoC") refers to a device currently used in the semiconductor industry that incorporates different functional circuit blocks on a single monolithic block of silicon to form one system circuit. Systems in a Package ("SiP") devices are currently used in the semiconductor industry to assemble multiple integrated circuits, other devices and passive components in one package. SiPs enable integration of devices with diverse device fabrication technologies such as digital, analog, memories and other devices and components such as discrete circuits, devices, sensors, power management and other SiPs that are otherwise impossible or impractical to integrate in a single silicon circuit like an ASIC or SoC. These other discrete circuits may include non-silicon based circuits, such as for example, organic substances. SiPs are also attractive because they allow miniaturization of microelectronic systems from a printed circuit board tens of square cm in size to typically a single package a few square cm or less. Another benefit of a SiP is that it allows for building prototypes to test a system prior to further integration of some or all of the components into a single monolithic silicon circuit to produce a SoC. A co-pending application, PCT/US2015/045022, which was filed Aug. 13, 2015, and is titled Improved Substrate for System In Package (SIP) Devices, is directed to a new, simplified SIP design. There remains a need, however, for the configuration of a common substrate comprising one or more connection matrices for use with SiP devices to achieve increased system flexibility and versatility.

SUMMARY

Aspects of the present disclosure relate to the translation or conversion of a desired circuit into a database that instructs a place and route and/or wire bonding machine where on a substrate to place components of the circuit, and in some instances, also where to place bond wires on the pads of a connection matrix (or matrices) on the substrate, to create the desired circuit. In some embodiments, the pads of the connection matrix are populated with bond wires using the database during the assembly process.

Aspects of the present disclosure allow for simplification of system design and board design by reducing the number of layers in a substrate (printed circuit board) used in a SiP. In some embodiments, the system and methods of the present disclosure may use a single substrate that employs one or more bond wire connection arrays (or matrices) capable of allowing different bond wire connections depending on the connections needed by the components mounted on the substrate for that system. These matrices allow unique systems to be created on a single common substrate by programming the matrices on that substrate differently via different bond wire connections for different systems, even when using the same components and hardware.

Aspects of the present disclosure enable use of a common or standard substrate for a plurality of similar systems using a SiP assembly process. The required system customization, which is defined by a system's unique component interconnections, is done during assembly by creating appropriate electrical connections ("links") with bond wires between pads that are strategically placed on the surface of the substrate in one or more connection matrices. In some embodiments, the matrix interconnections are intentionally left open or not connected for the purpose of being able to make multiple, different and unique customized wire bond link patterns depending upon the electrical components used in a system and the system's desired application(s), function(s), design(s) and/or specification(s). The methods and tool of the present disclosure enable these wire bond links to be changed as necessary by a system's design just prior to final packaging.

Aspects of the present disclosure allow for the use of a substrate that may have multiple metal layers for interconnection of different circuits, in addition to the bond wires on the surface, to handle power rails and other common interconnections; so changeable interconnections may be on the surface and fixed interconnections may be embedded in the substrate. For some implementations, the surface wire bond links may act as additional layers of the substrate, thus reducing the number of metal layers within the substrate. The wire bond links provide the flexibility to reconfigure, reprogram or repair a common substrate to create multiple different systems using connection matrices on that substrate based on the components installed on a substrate (for new system functionality). It should be noted that other hardware methods such as zero ohm resistors and screened or printed insulators/conductors (for example, electronic ink) may be employed to accomplish the programming (making application specific circuits from a general circuit), or be used in addition to the use of bond wires to program the system on the substrate.

In some embodiments, a design device comprises a memory and a processor coupled to the memory. The processor may be configured to receive information regarding a circuit, wherein the information indicates components of the circuit and interconnections between the components; receive layout information for a substrate, wherein the substrate comprises at least one connection matrix comprising a plurality of electrically conductive pads arranged to allow electrical interconnections between at least a first and second of the pads of each of the at least one connection matrix; determine component locations on the substrate for each of the components of the circuit, and determine connections for the components of the circuit and interconnections for the components using the plurality of electrically conductive pads in each of the at least one connection matrix.

In some embodiments, the processor is further configured to generate a graphical representation of the circuit based on at least the received information regarding a circuit and the received layout information for the substrate. In some embodiments, the processor is further configured to determine the connections and interconnections for the components based on the graphical representation of the circuit. In some embodiments, the processor is further configured to list the component locations, the component connections, the component interconnections, and associated pads in the at least one connection matrix in a format suitable for use in an assembly line. In yet another embodiment, the processor is further configured to output the determined connections in a format suitable for use by a machine configured to connect the determined connections with at least one of: wire bonds, zero ohm resistors, printed or screened insulators, and screened or printed conductors. The received information may comprise, for example, at least one of a schematic file, a netlist file, and a circuit diagram. The received layout information may comprise, for example, active and passive component locations on the substrate, centralized and distributed matrix pad locations, pad interconnections, and substrate connections between substrate layers. In some embodiments, the processor is further configured to receive die pad information for active components of the circuit.

In some embodiments, the interconnections for the components are determined based on one or more optimization criteria. The optimization criteria may comprise, for example, at least one or more of: minimizing interconnection distances, avoiding any overlapping of bond wire interconnections, optimizing use of the matrix pad locations nearest an active circuit component location, minimizing bond wire length, highest performance, minimizing usage of the bottom side of the substrate for component placement, minimizing bond wire sizes, optimizing for best overall power management, minimizing cost, minimizing power, selectively minimizing noise components, and minimizing component cross-talk. In some embodiments, the interconnections for the components are determined based on an optimization algorithm.

According to some embodiments, a method for locating components on a substrate is provided. The method includes generating a graphical representation of a circuit, where the graphical representation comprises information indicating at least components of the circuit and interconnections between each of the components, prioritizing the interconnections between each of the components of the circuit received in the graphical representation, and determining optimized connections for each of the components of the circuit to at least one matrix comprising a plurality of electrically conductive pads arranged to allow electrical interconnections between at least a first and second of the pads of the matrix based on the prioritized interconnections, where each of the connections for each of the components of the circuit are assigned to an associated electrically conductive pad of the plurality of electrically conductive pads. In some embodiments, the method further includes determining interconnections among the plurality of electrically conductive pads based on the optimized assignments for each of the components of the circuit. In some embodiments, the method further includes generating a database for the determined interconnections. In some embodiments, the method further includes formatting the generated database in a format suitable for use by a machine configured to connect the determined interconnections with at least one of: wire bonds, zero ohm resistors, printed or screened insulator, and screened or printed conductors. The graphical representation may, for example, comprise an indication of a priority for each of the interconnections.

According to some embodiments, a design device comprises a memory and a processor coupled to the memory, where the processor is configured to receive a circuit schematic comprising information regarding components and interconnections between each components for a circuit or system; receive information regarding a substrate, wherein the substrate comprises a plurality of component locations with associated bond pads and a connection matrix comprising pads associated with the component bond pads; identify a component location on the substrate for each of the components of the circuit or system; determine connections for each of the components with the component bond pads of each associated component location; and determine the interconnections for each of the components using the pads of connection matrix.

In some embodiments, the processor is further configured to output the determined interconnections in a format suitable for use by a machine configured to connect the determined interconnections with at least one of: wire bonds, zero ohm resistors, printed or screened insulator, and screened or printed conductors. In some embodiments, the substrate may, for example, comprise a second connection matrix comprising pads associated with the component bond pads, and the processor is further configured to determine the interconnections for each of the components using the pads of the second connection matrix.

According to some embodiments, a method for designing a circuit or system is provided. The method includes receiving a circuit diagram for an integrated circuit or system; identifying each component of the circuit diagram and the interconnections between components; selecting a substrate based on the received circuit diagram, wherein the substrate comprises a plurality of component locations with associated bond pads and at least one connection matrix with pads uniquely associated with the component bond pads; mapping each component and associated interconnections onto the plurality of component locations and associated matrix pads; and generating a set of interconnections between the matrix pads that correspond to the interconnections of the components in the circuit diagram.

In some embodiments, the method further includes formatting the generated set of interconnections into a database suitable for use by a machine configured to connect the determined interconnections with at least one of: wire bonds, zero ohm resistors, printed or screened insulator, and screened or printed conductors. In some embodiments, the method further includes installing the components on the mapped component locations and connecting the components to associated component bond pads; and connecting the matrix pads based on the generated set of interconnections. In some embodiments, the matrix pads are connected based on the generated set of interconnections using at least one of: wire bonds, zero ohm resistors, printed or screened insulator, and screened or printed conductors. In some embodiments, the generated set of interconnections may be based on determining a particular set of interconnections between the matrix pads based on one or more optimization criteria. The optimization criteria may comprise, for example, at least one or more of: minimizing interconnection distances, avoiding any overlapping of bond wire interconnections, optimizing use of the matrix pad locations nearest an active circuit component location, minimizing bond wire length, highest performance, minimizing usage of the bottom side of the substrate for component placement, minimizing bond wire sizes, optimizing for best overall power management, minimizing cost, minimizing power, selectively minimizing noise components, and minimizing component cross-talk.

According to some embodiments, a method for determining wire bond interconnections for a circuit or system. The method includes determining matrix pad sizes and locations and component pad sizes and locations on a substrate, wherein the substrate comprises at least one matrix comprising a plurality of electrically conductive pads for interconnections between each of the components of the circuit or system; determining interconnections between the matrix pads based on: (i) component connections to the matrix pads, (ii) component interconnections, and (iii) the determined matrix pad sizes and locations; and generating a database comprising the determined interconnections between the matrix pads. In some embodiments, the generated database is suitable for use by a machine configured to connect the determined interconnections with at least one of: wire bonds, zero ohm resistors, printed or screened insulator, and screened or printed conductors.

According to some embodiments, a method for forming wire bond interconnections for a circuit or system is provided. The method includes selecting a substrate comprising a plurality of component locations and at least one connection matrix comprising pads connected to associated component bond pads for each component location, wherein each component location comprises component bond pads which provide electrical connection to a component installed in the component location; selecting a circuit for use with the substrate, wherein the circuit comprises identified components and interconnections between each of the components; determining a location for each of the components of the circuit in one of the plurality of component locations on the substrate; determining interconnections between the located components of the circuit by connecting associated pads of the connection matrix using bond wire; assembling each of the components in the determined component location and connecting the component with the bond pads associated with the component location; and forming the identified interconnections using bond wire to connect the determined matrix wire bond pads.

According to some embodiments, a method for assembling a circuit or system is provided. The method includes receiving a schematic for a circuit or system, wherein the schematic comprises information regarding components and interconnections between each of the components of the circuit or system; selecting a substrate comprising a plurality of component locations with associated bond pads and at least one connection matrix comprising pads associated with the component bond pads; assembling each of the components on a corresponding component location and connecting the component with the component bond pads for the corresponding component location; and interconnecting the components by connecting the associated pads in the connection matrix using bond wire.

In some embodiments, a design device comprises a data storage system and a data processing apparatus comprising a processor. The data processing apparatus is coupled to the data storage system and configured to receive information regarding a circuit, wherein the information indicates components of the circuit and interconnections between the components; receive layout information for a substrate, wherein the substrate comprises at least one connection matrix comprising a plurality of electrically conductive pads arranged to allow electrical interconnections between at least a first and second of the pads of each of the at least one connection matrix; determine component locations on the substrate for each of the components of the circuit, and determine connections for the components of the circuit and interconnections for the components using the plurality of electrically conductive pads in each of the at least one connection matrix.

In some embodiments, the data processing apparatus is further configured to generate a graphical representation of the circuit based on at least the received information regarding a circuit and the received layout information for the substrate. In some embodiments, the data processing apparatus is further configured to determine the connections and interconnections for the components based on the graphical representation of the circuit. In some embodiments, the data processing apparatus is further configured to list the component locations, the component connections, the component interconnections, and associated pads in the at least one connection matrix in a format suitable for use in an assembly line. In yet another embodiment, the data processing apparatus is further configured to output the determined connections in a format suitable for use by a machine configured to connect the determined connections with at least one of: wire bonds, zero ohm resistors, printed or screened insulators, and screened or printed conductors. The received information may comprise, for example, at least one of a schematic file, a netlist file, and a circuit diagram. The received layout information may comprise, for example, active and passive component locations on the substrate, centralized and distributed matrix pad locations, pad interconnections, and substrate connections between substrate layers. In some embodiments, the data processing apparatus is further configured to receive die pad information for active components of the circuit.

In some embodiments, the interconnections for the components are determined based on one or more optimization criteria. The optimization criteria may comprise, for example, at least one or more of: minimizing interconnection distances, avoiding any overlapping of bond wire interconnections, optimizing use of the matrix pad locations nearest an active circuit component location, minimizing bond wire length, highest performance, minimizing usage of the bottom side of the substrate for component placement, minimizing bond wire sizes, optimizing for best overall power management, minimizing cost, minimizing power, selectively minimizing noise components, and minimizing component cross-talk. In some embodiments, the interconnections for the components are determined based on an optimization algorithm.

According to some embodiments, a design device comprises a data storage system and a data processing apparatus comprising a processor. The data processing apparatus is coupled to the data storage system and configured to receive a circuit schematic comprising information regarding components and interconnections between each components for a circuit or system; receive information regarding a substrate, wherein the substrate comprises a plurality of component locations with associated bond pads and a connection matrix comprising pads associated with the component bond pads; identify a component location on the substrate for each of the components of the circuit or system; determine connections for each of the components with the component bond pads of each associated component location; and determine the interconnections for each of the components using the pads of connection matrix.

In some embodiments, the data processing apparatus is further configured to output the determined interconnections in a format suitable for use by a machine configured to connect the determined interconnections with at least one of: wire bonds, zero ohm resistors, printed or screened insulator, and screened or printed conductors. In some embodiments, the substrate may, for example, comprise a second connection matrix comprising pads associated with the component bond pads, and the data processing apparatus is further configured to determine the interconnections for each of the components using the pads of the second connection matrix.

These and other features of the disclosure will become apparent to those skilled in the art from the following detailed description of the disclosure, taken together with the accompanying drawings.

BRIEF DESCRIPTION OF THE DRAWINGS

FIG. 6C is a diagram of wire bond connections of matrix pads according to some embodiments.

FIG. 8B is a diagram of layout information of a substrate according to some embodiments.

FIG. 9A is a diagram of a datasheet for a component according to some embodiments.

FIG. 10 is a diagram of a partial listing of a file used by a system according to some embodiments.

FIG. 13 is a diagram of a partial listing of a file used by a system according to some embodiments.

FIG. 14C is a diagram of a data sheet for a circuit according to some embodiments.

DETAILED DESCRIPTION

Figure 1:
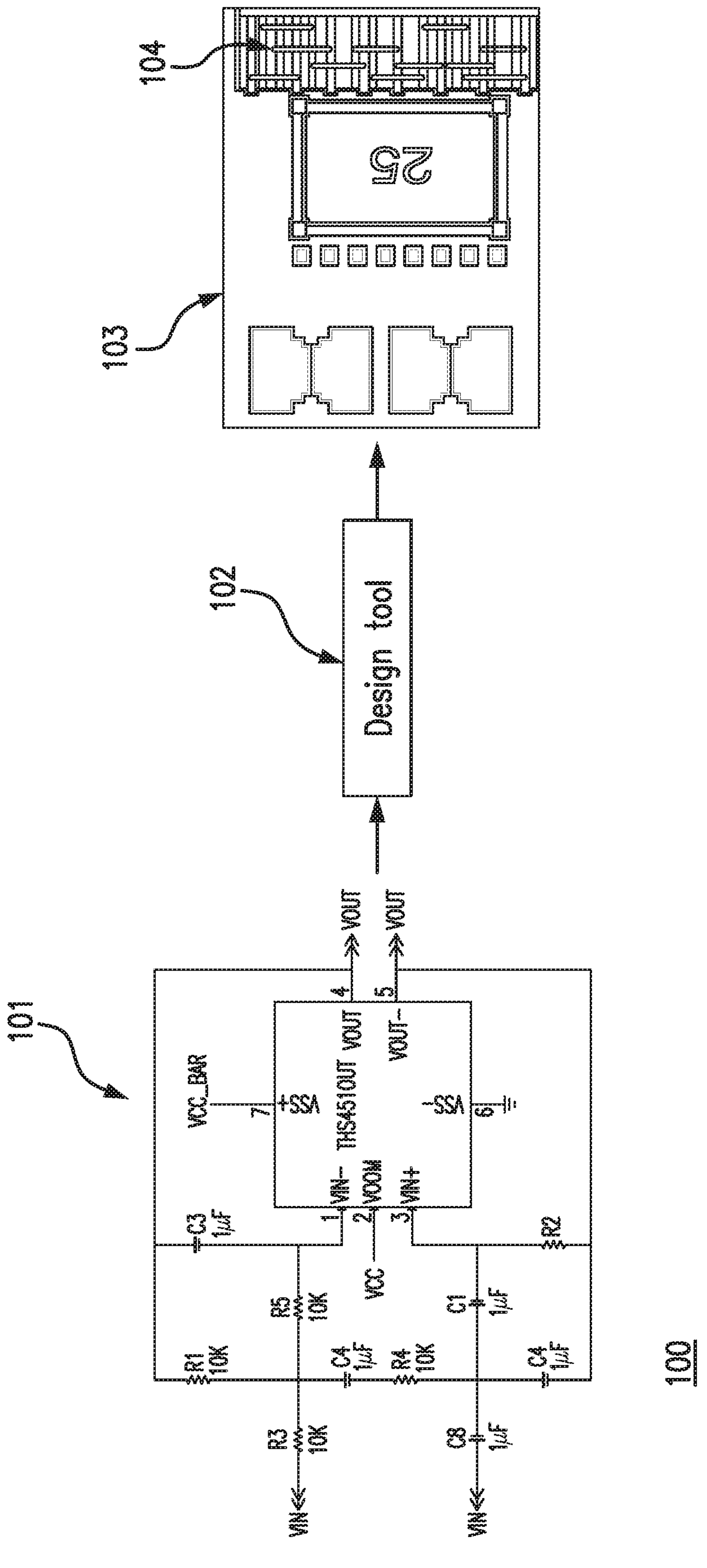
FIG. 1 illustrates an overview of a system according to some embodiments.

FIG. 1 illustrates an overview of a system 100 according to some embodiments. In this example, the system 100 includes a design tool 102 of the present disclosure, and FIG. 1 illustrates simplified input and outputs of the tool. In some embodiments, a system designer may provide a circuit description 101 of the desired product that will serve as an input to the design tool 102 to automate the bond wire routing process. In some embodiments, an output of the design tool 102 may be a net file or an instruction file specific to the wire bond machine used in manufacturing the product or SiP. Bond wires 104 are appropriately placed in the matrix portion of a substrate 103 to connect the components, matching the component connections in the circuit description 101. Further referring to FIG. 1, substrate 103 may be a portion of a substrate, corresponding to a portion 205 of a substrate 200 of FIG. 2A.

In another embodiment, the output of the tool 102 may be a net file or an instruction file that specifies the placement (or location) of the components on the selected substrate and is provided to a placement machine for component placement on a substrate. In this embodiment, the circuit description 101 may be in the form of a schematic, a net list or other formats that describe the components and their interconnections for the desired (input) circuit provided as an input to the tool of the present disclosure. Additional inputs may also be made to the tool 102 to facilitate the determination of the placement of components and interconnections, such as, for example, but not limited to, a layout description of the substrate, component information, and wire bond and placement machine manufacturer specifications along with other inputs such as a manufacturer's bond wire specifications and user specifications.

In certain aspects, the design tool and methods of the present disclosure may be for the design of a System in a Package (SiP). SiP development for electrical devices often has a design cycle with several phases from circuit design to manufacturing. Along with other advantages, having a SiP using a configurable substrate will drastically reduce the time spent working on the design of a SiP.

According to some embodiments, for the configurable substrate to be made into a user specified product, methods and a design tool are provided to translate the specified product circuit requirements created by a designer to a component and wire bond placement input for use in the assembly phase of a SiP. A substrate having one or more matrices for making connections to and interconnections between components on that substrate may be referred to herein as a "configurable substrate," as well as "programmable" and/or "customizable." The design tool and methods of the present disclosure can translate or convert the desired circuit into a database that instructs the place and route and/or wire bonding machine where on the substrate to place the components and also where to place bond wires on the pads of a connection matrix (or matrices) of the substrate to create the desired circuit. In the assembly process, the pads of the connection matrix are populated with bond wires using that database.

Figure 2A:
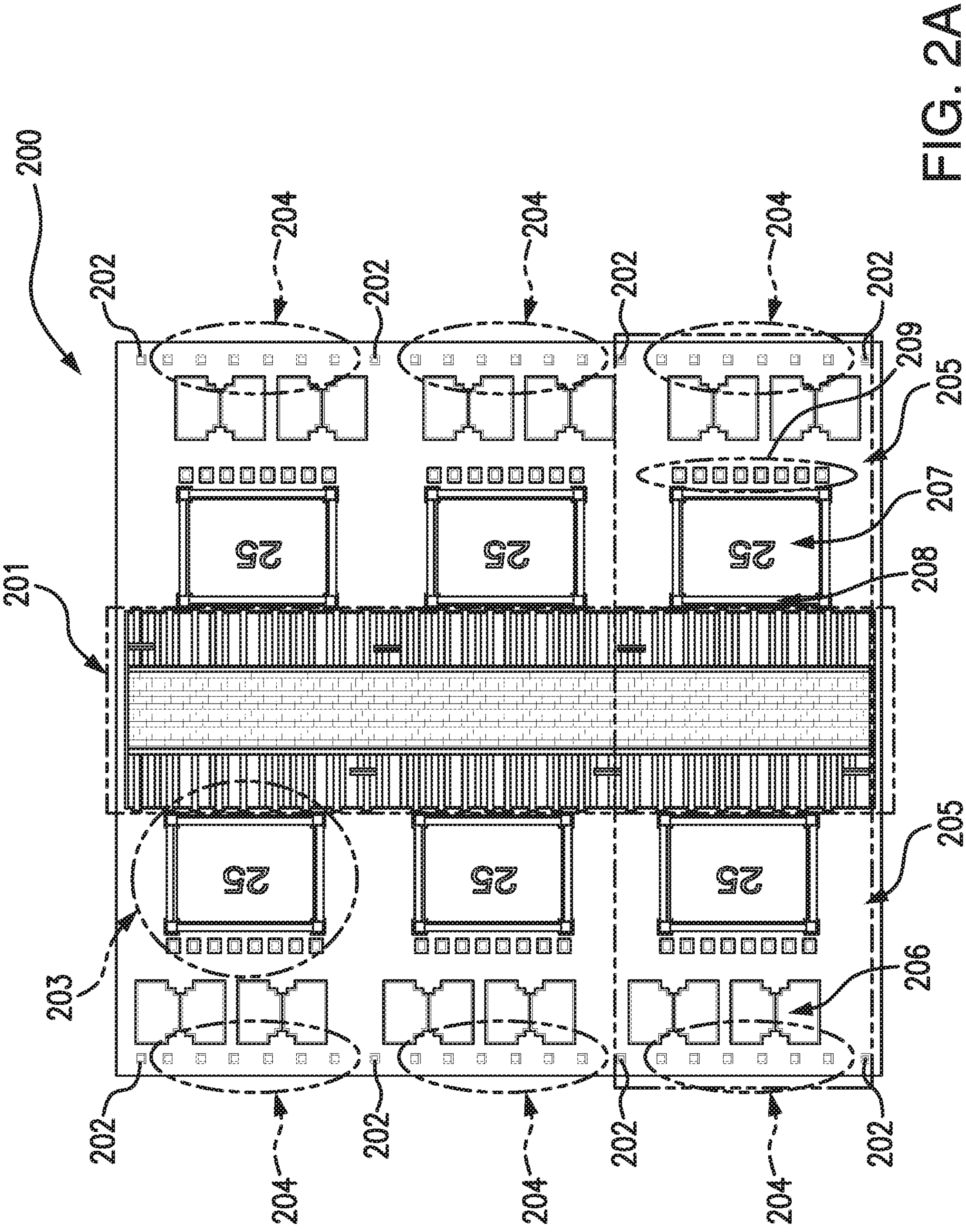
FIG. 2A is a diagram of a substrate according to some embodiments.

The design tool and methods of the present disclosure may be employed with a substrate having at least one configurable matrix suitable for component connections and interconnections. For instance, FIG. 2A is a diagram of a substrate according to some embodiments. In this example, FIG. 2A illustrates a substrate having a configurable interconnection matrix that may be employed in the design tool and methods of the present disclosure for use in a SiP. FIG. 2A illustrates an embodiment of a substrate 200 used for a configurable SiP and one that may be used for a family of similar product types. As depicted in FIG. 2A, substrate 200 has 6 identical segments 205. However, this number of segments is not required and the substrate 200 may have a varied number of segments in alternative embodiments with each segment providing the capability of accommodating an active device 203, such as, for example and not limited to, an Operational Amplifier ("Op-Amp"). In addition, each segment may accommodate a number of passive devices 206, inputs/outputs 204 and power supplies 202. Other components, not shown in FIG. 2A, such as sensors, diodes, transistors, or passives like resistors, capacitors, inductors, transformers may also be accommodated. For the substrate 200 shown in FIG. 2A, the signals from all the components on substrate 200 are connected to a matrix of pads ("connection matrix" or "matrix") 201. The design tool and methods of the present disclosure may be employed with such a matrix on a substrate to allow for making changeable and programmable component interconnections in accordance with a system's functional requirements. There may be multiple such matrices on one SiP substrate. Similarly, the substrate may have the capability to contain multiple active and passive components in a given segment. Although not shown in FIG. 2A, additional passive components may be located on the back side or underside of the substrate. Also, and according to some embodiments, the segments 205 need not be identical.

Figure 2B:
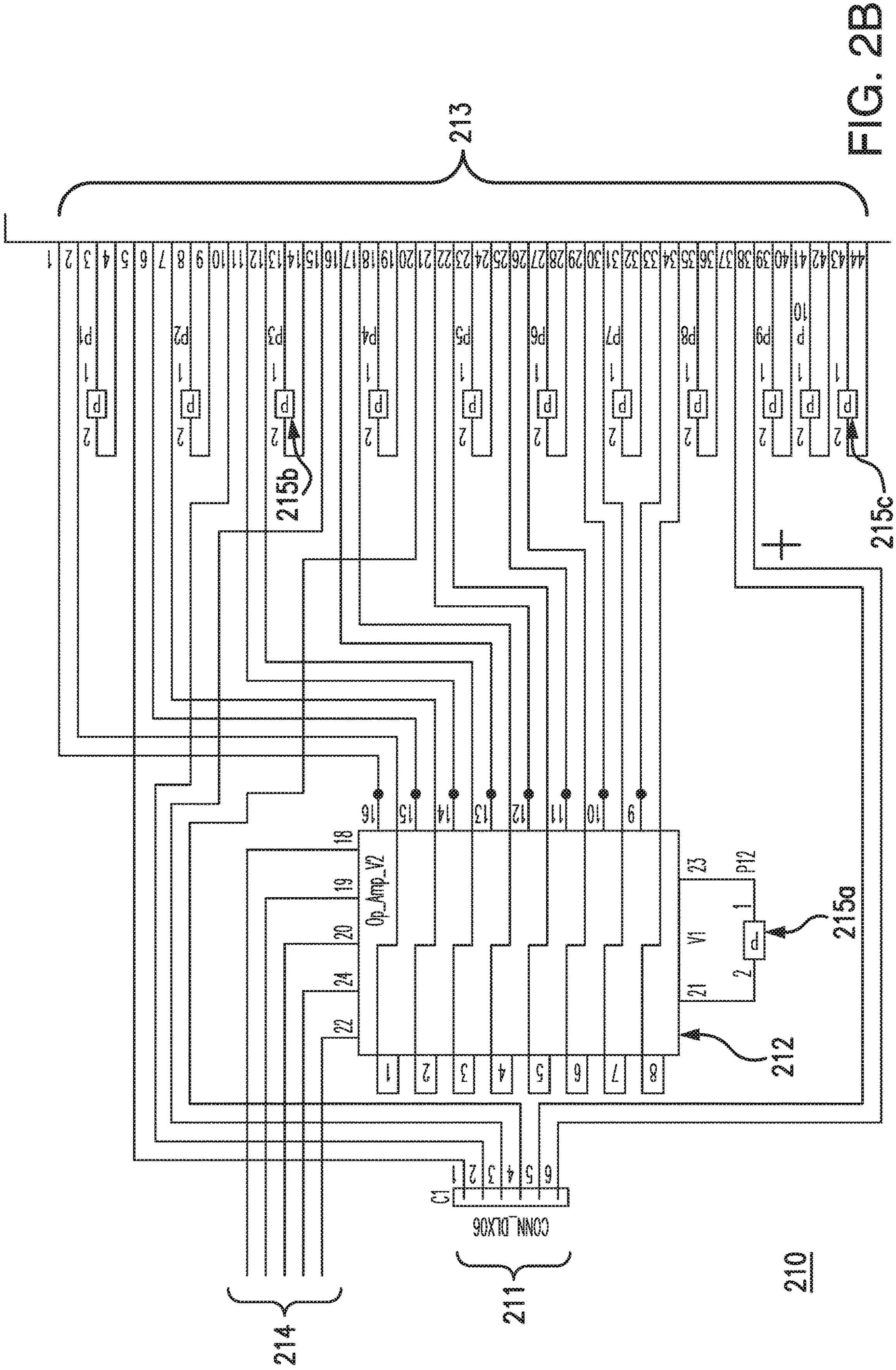
FIG. 2B is a diagram of a portion of the substrate according to some embodiments.

FIG. 2B is a diagram of a portion of the substrate according to some embodiments. In this example, FIG. 2B illustrates a schematic circuit 210 for use as an input to the tool 102 in accordance with some methods of the present disclosure. For instance, FIG. 2B illustrates a way in which an active device like an Operational Amplifier (Op Amp) and associated components may be arranged and individually connected to an interconnection matrix for use in a substrate like that in FIG. 2A. In some embodiments, schematic circuit 210 may be used in one or more of the segments 205 of the substrate 200 of FIG. 2A. It includes an integrated circuit (IC)/active component 212, such as an Op-Amp or Op-Amp like device (similar to device 203 of FIG. 2A), passive components 215*a*, 215*b*, 215*c*, Input/Output signals 211 and power signals 214. The passives and Input/Outputs signals from the active device 212 are all connected to the matrix 213 (similar to matrix 201 of FIG. 2A), making it a layout of partially connected components (e.g. the components are only connected to the matrix 213 of FIG. 2B) that can then be interconnected by using bond wire connections between appropriate pads of the matrix 213. Matrix 213 may be a portion of a matrix, like for example, the matrix 201 of FIG. 2A)

FIG. 2A further illustrates power pads 208 laid out around the active device die location 207. These pads are configurable and can be connected to the power supply signals of the SiP substrate. In some respects, these pads 208 form a connection matrix distributed around the active device locations to facilitate access to all of the power and ground pads on a component's die. The power signals 214 may optionally be connected to such a matrix. The distributed connection matrix elements may be connected to the active component die's power pads via bond wires and may be a factor in determining the placement of the active component in position 212 of FIG. 2B and position 207 in FIG. 2A. A distributed connection matrix may also be used for non-power signals, which may need to be distributed to and interconnected with several components. FIG. 2A also depicts wire bond pads 209 laid out around the six active device locations, one of which device locations is labelled 207. These pads are configurable and may be connected to the connection matrix pads 201. As shown in FIG. 2A, there may be optional component locations or "foot prints" for each component's location on the substrate 200 that allows for multiple different component placements the configurable substrate 200 has the ability to accommodate a variety of different types of devices.

In some embodiments, the power planes (or layers) can be isolated from the signal layers. Using a configurable substrate allows bond wires to be used in lieu of vias from one substrate layer to another substrate layer using appropriate matrix pads. While each of the segments 205 may be used to form a standalone system, the design tool and methods of the present disclosure may also use each such segment as a subsystem and appropriately interconnect the populated segments on that same substrate to form a complete system.

For a configurable substrate to be made into a user specified product, embodiments are provided to translate the specified product circuit requirements created by a designer (or otherwise provided) into a component and wire bond placement input. This input may be used, for instance, in the assembly phase of a SiP. In certain aspects, the design tool and associated methods translate or otherwise convert a desired circuit into a database that instructs the place and route and/or wire bonding machine where on the substrate to place the components and also where to place bond wires on the pads of the connection matrix (or matrices) of the substrate, thus creating the desired circuit. In the assembly process, the pads of a connection matrix can be populated with bond wires based on that database.

Figure 3:
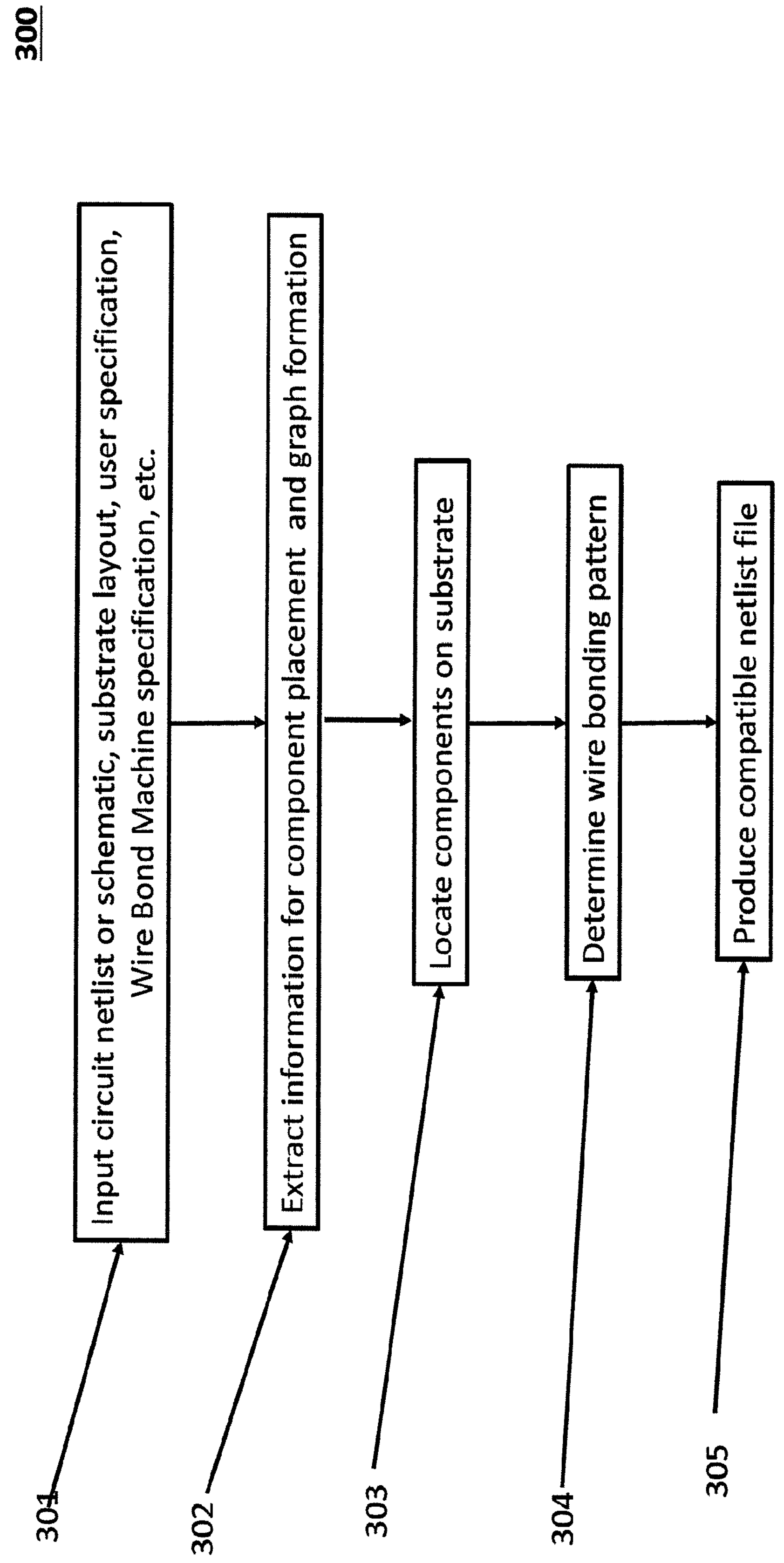
FIG. 3 is a flow diagram that illustrates processes according to some embodiments.

Referring now to FIG. 3, a block diagram 300 of process steps for a design tool, such as tool 102, are shown. In this example, FIG. 3 depicts a method 300 for automating the routing process for the bond wire connections for a circuit on a customizable SiP substrate layout, similar to the substrate 200 described in FIG. 2A and substrate 103 described in FIG. 1, having a centralized interconnection matrix 201. The process may begin with step 301, in which a system designer (or user) inputs a circuit or schematic description, a netlist for example, to a tool 102. In some embodiments, other inputs such as a layout description of potential component locations on a selected configurable substrate, user/manufacturer specifications and other specific inputs regarding tool 102 specific requirements may be input by the system designer (or user). According to some embodiments, the tool 102 will assign the desired circuit's components (included as part of the input circuit) to the footprints or locations on the selected substrate. In step 302, the tool 102 extracts information based on the inputs received in step 301 and forms a graph data-type to represent the circuit. In some embodiments, once the tool 102 receives the inputs and required information for component assignment and graph formation, all the unique paths in the desired circuit are extracted. With the extracted paths, the design tool 102 determines the pad-vertex assignments in which the vertices of the formed graph representing the circuit and the pads of components of the circuit are assigned to matrix pads based on various optimization criteria. The optimization criterion, may be for example, an optimizing algorithm using one or more optimization variables, such as for example, but not limited to, bond wire length, highest performance, lowest cost, lowest power dissipation, optimal use of the component placement or similar variables.

In step 303, the tool 102 locates components on the substrate by locating the components used by the circuit at various suitable locations on the selected configurable substrate. Accordingly, the tool 102 determines the location/placement of each component on the selected substrate and the respective pad locations for each component in the matrix 201 on the selected substrate 200.

Further referring to FIG. 3, in step 304, the design tool 102 determines a wire bonding pattern after component location on the substrate. In this example, the design tool 102 generates data for connection between matrix pads associated with those component locations, which results in a bond wire database (or "pattern") that connects the appropriate matrix pads in the connection matrix (similar to that of connection matrix 201 of FIG. 2A) and in the distributed matrix (similar to that of distributed matrix 208 of FIG. 2A) along with the die pads on any active device (similar to that of die pads 209 of FIG. 2A) and any other components' pads to form the desired circuit 101.

According to some embodiments, the process 300 includes step 305, in which the bond wire database is produced. For instance, it can be written to a database/netlist according to the required input specifications of the machine performing the actual component and bond wire placements. The written database/netlist may contain the physical location and placement for each component, the routing of the signals from each component to the pads of the various connection matrices and the wire bond connections between the pads within each connection matrix and/or pads in any other location Referring to FIG. 4, this figure depicts a functional view of a design tool 400 (the design tool 102 of FIG. 1). This design tool may, for instance, implement one or more processes for automating the routing process for the wire bond connections of a circuit on a configurable substrate for a matrix configuration as described in FIGS. 2A-B. For instance, tool 400 may perform one or more steps set forth with respect to FIG. 3.

Figure 4:
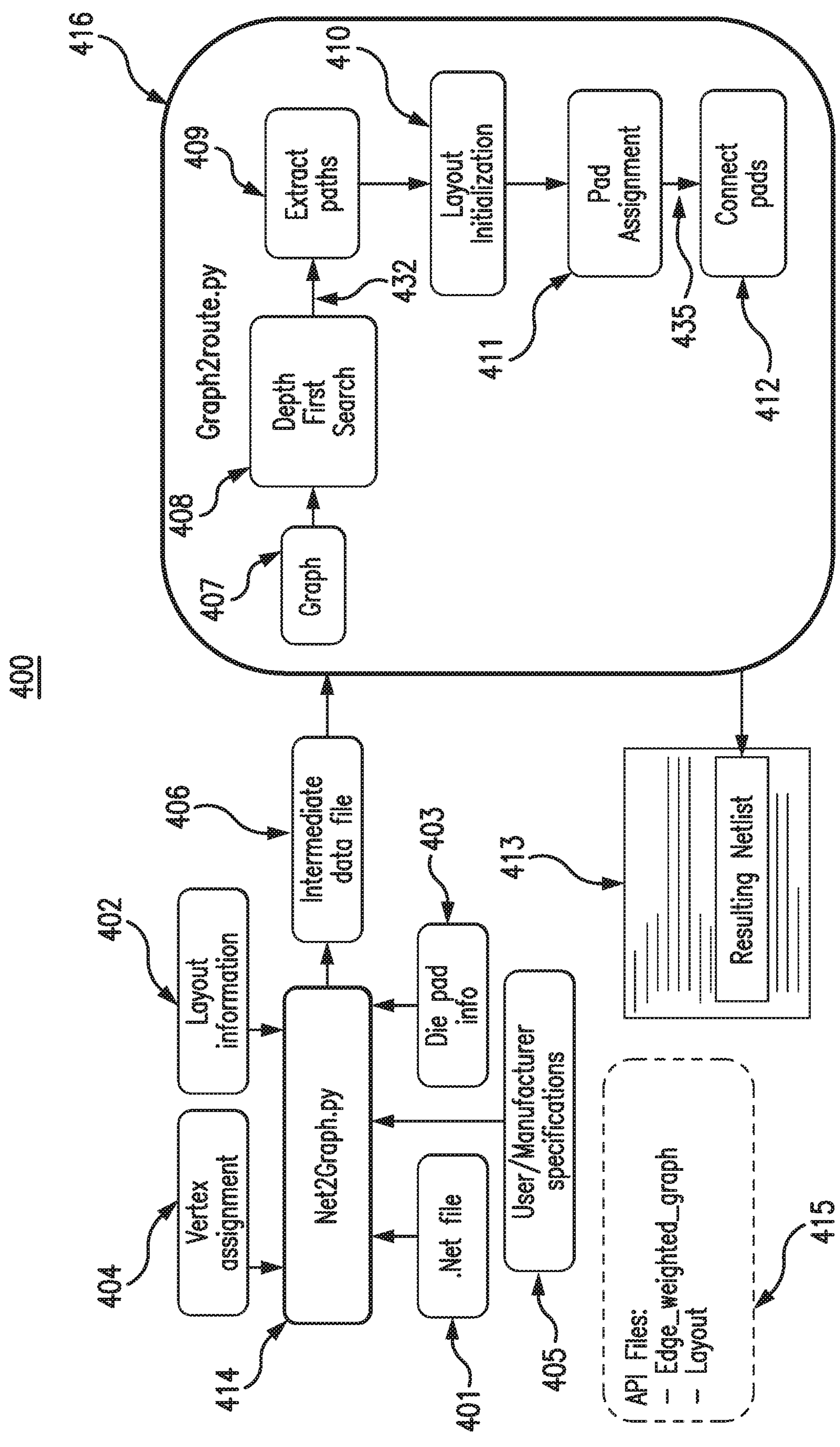
FIG. 4 is a functional diagram of a system and process according to some embodiments.

According to some embodiments, FIG. 4 illustrates an overview and flow diagram relating to a design tool. This may be a Python (or other object oriented programming language) based design tool that implements one or more methods of the present disclosure. In certain aspects, after a system designer (or user) inputs a first file (e.g., database) 401 created from a schematic capture of the desired product circuit along with die pad information 403 for the selected system substrate, vertex assignment information 404 and substrate layout 402, an intermediate data file 406 is created, using Net2Graph.py 414 in this example.

According to some embodiments, the file or database 401 may be, for instance, as described with reference to database 800 of FIG. 8A and/or circuit description 502 of FIG. 5A. Also, the information 403 may be, for instance, as described with reference to table 901 of FIG. 9 and/or die 504 of FIG. 5A. In certain aspects, the assignment information 404 may be, for instance, as described with reference to item 503 of FIG. 5A and/or item 910 of FIG. 9 and the layout 402 may be, for instance, as described with reference to layout information 506 of FIG. 5A and/or layout information 810 of FIG. 8B. Also, data file 406 may be, for instance, as described with reference to intermediate file 1001 of FIG. 10.

Figure 11:
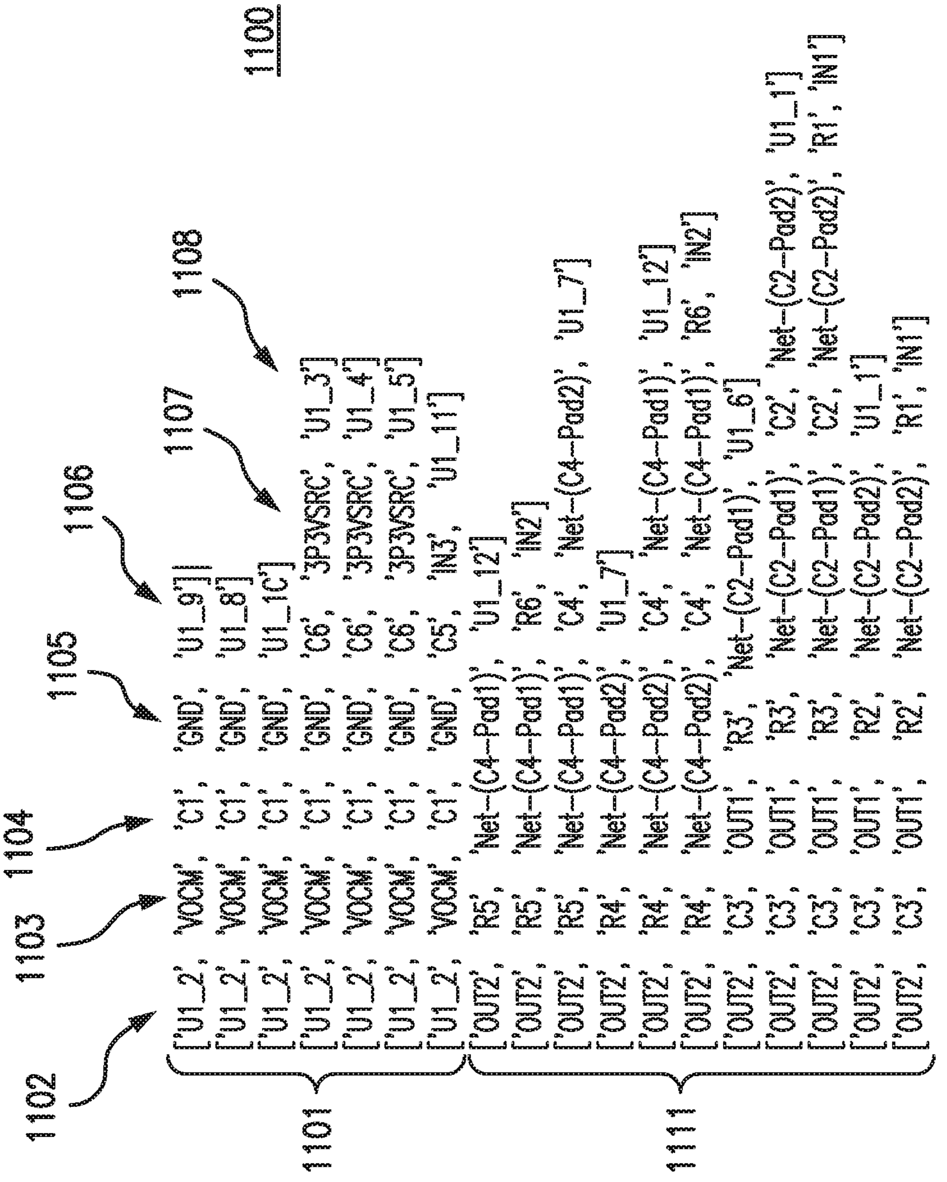
FIG. 11 is a diagram of a partial listing of a file used by a system according to some embodiments.

According to some embodiments, the intermediate data file 406 has all the information compiled into it for additional intermediary steps of the methods of the present disclosure for creating a graphical representation of the circuit for further processing as noted in program file 416 [program (Graph2route.py)]. The program file 416, according to some implementations of the methods and design tool of the present disclosure, parses the input intermediate file (for example, as described later herein with reference to intermediate file 1001 of FIG. 10) to form a graph structure of the input circuit. This is done by initializing the graph 407 and implementing a depth first search 408 based traversal. An example output from the method 408 is depicted in FIG. 11.

The function 409 may be used to trim the output of 408, which may be, for instance, as described with reference to extracted paths 1100 and depicted in FIG. 11. This trimming can be used to eliminate all duplicate paths, loops, and missing connections, and all the paths of the graph may be extracted. In some aspects, the format of the output of the function 409 may be the same as that depicted as extracted paths 1100 in FIG. 11, but with the duplicate paths having been eliminated. Using the layout information 402 (for instance, as described with reference to item 810 and depicted in FIG. 8B), the function 410 initializes the layout by creating pad objects defined in layout files 415, which files are used by both functions 414 and 416. Some aspects of the functions 411 and 412 of the tool 400 are described in more detail with regard to FIGS. 5 and 6. In this example, the final output netlist 413 of the program Graph2route.py 416 and its sub-functions can be the input to a wire bonding machine for component and bond wire placement. An example of a possible output of the program and the tool 400 described in FIG. 4 is illustrated in FIG. 13.

Figure 5A:
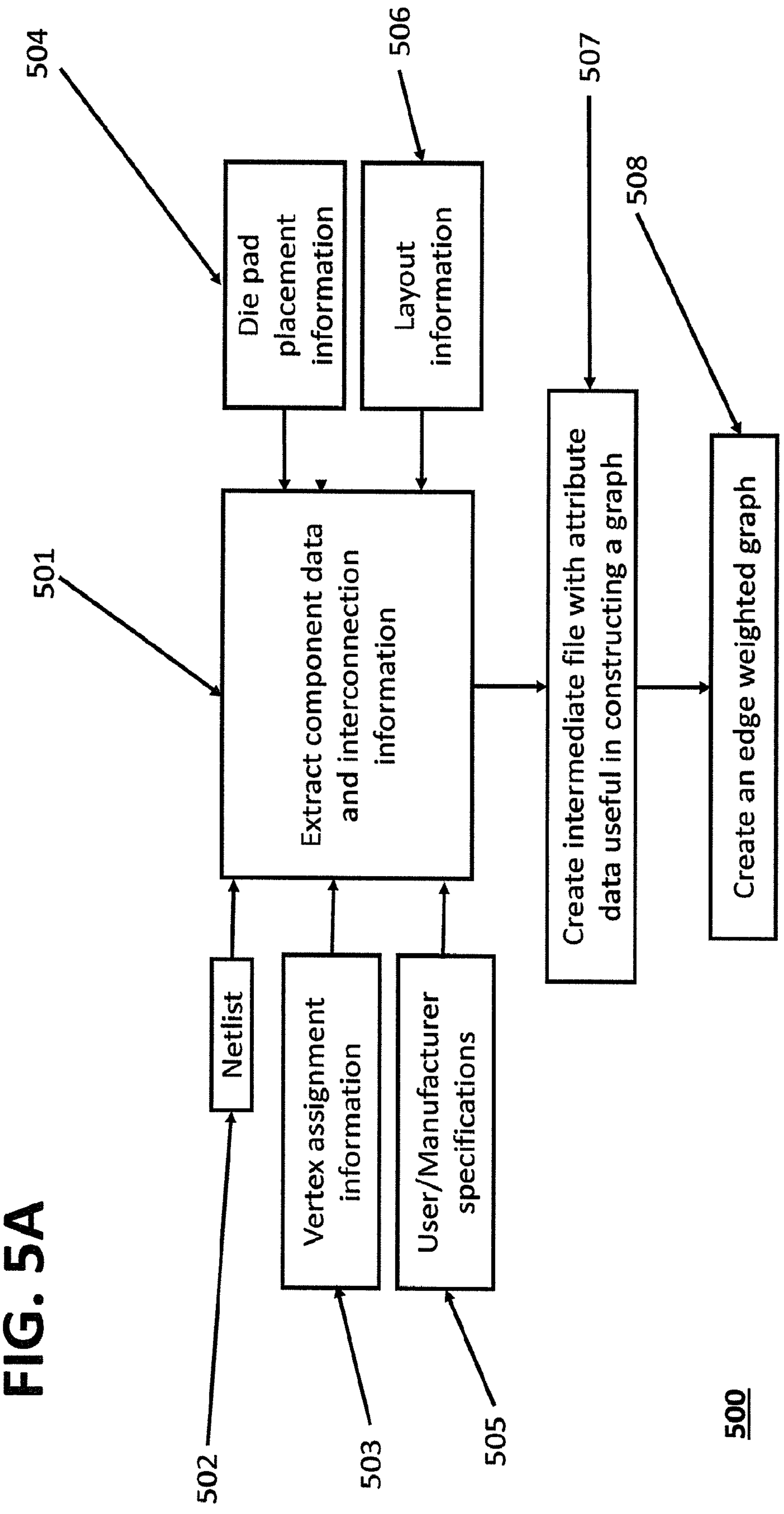
FIG. 5A is a flow diagram that illustrates processes according to some embodiments.
Figure 9B:
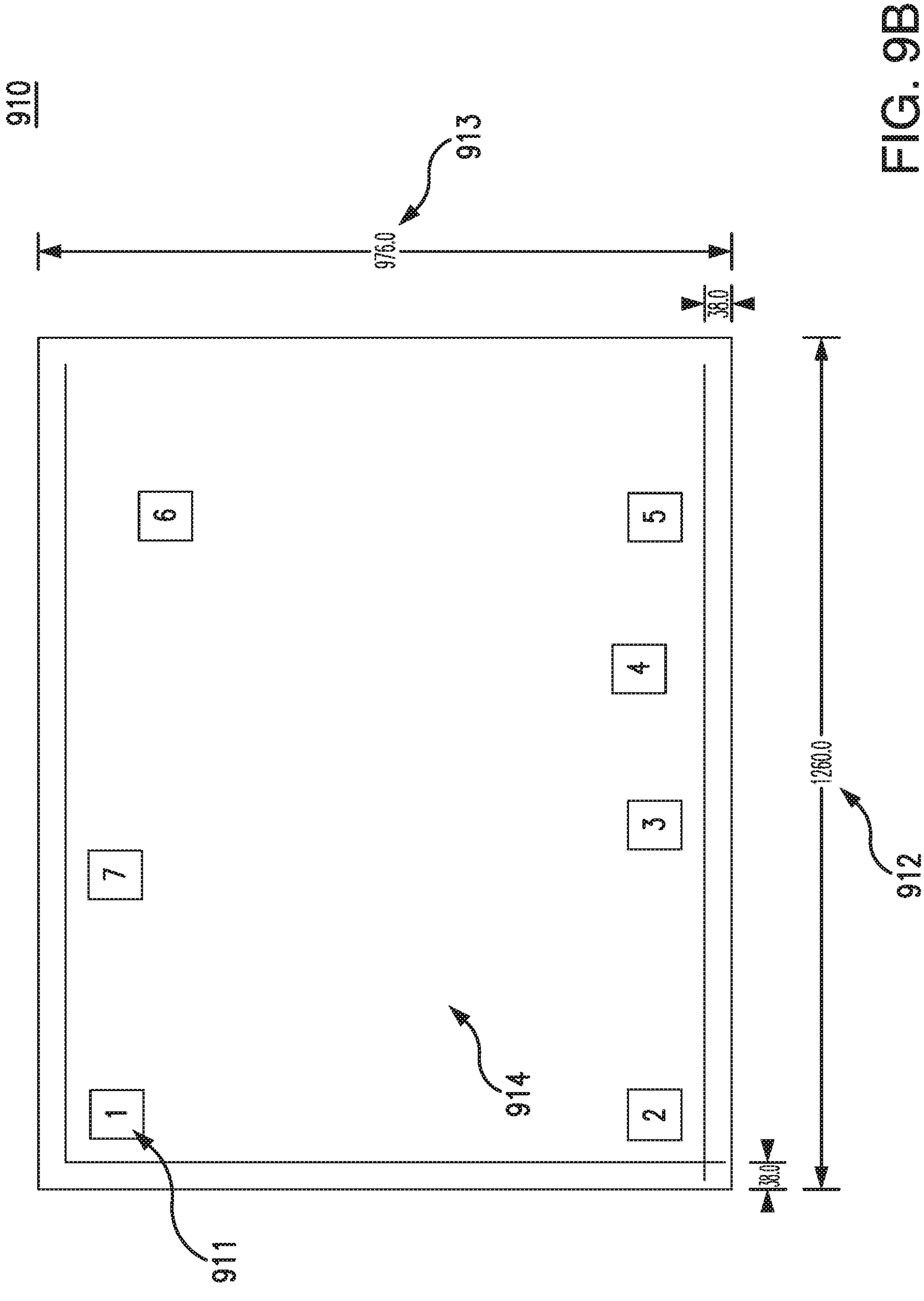
FIG. 9B is a diagram of a die layout according to some embodiments.
Figure 9C:
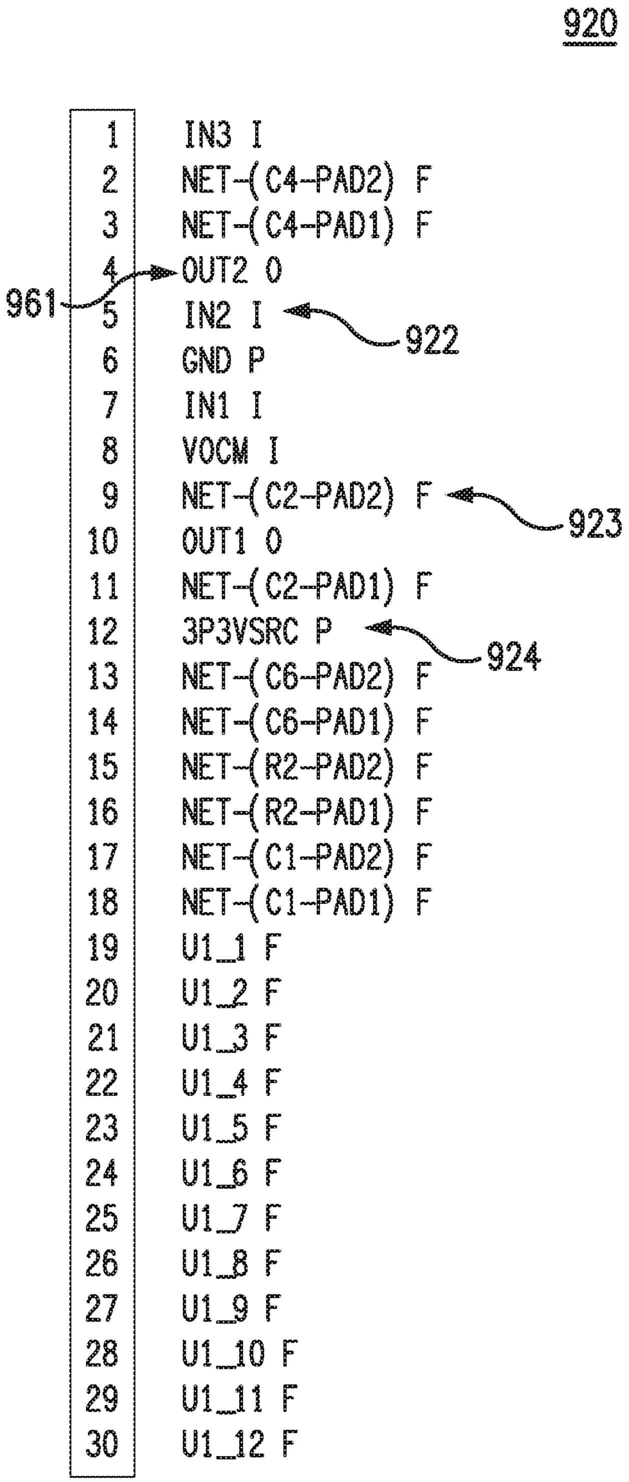
FIG. 9C is a diagram of vertex assignment information according to some embodiments.

FIG. 5A shows a flow diagram 500 of how a graph data-type representation 508 of the circuit 101 may be, according to some embodiments, constructed from the circuit description 101 and other inputs, such as, netlist 502, vertex assignment information 503, die pad placement information 504, user/manufacturer specifications 505, and layout information 506 provided by the user for use in the design tool 102 and related processes. The process may begin, for instance, with step 501, in which component data and interconnection information are extracted. This may be, in some aspects, similar to pad assignment 414 in FIG. 4 and related to steps 301 and 302 of FIG. 3. Continuing to refer to FIG. 5A, example inputs and data bases for use in the design tool 102 can include:

a. The input of the circuit description ("input circuit" or "desired circuit") 502 for the tool can be the schematic file 101, (similar to schematic file 700 of FIG. 7) generated by a schematic capture system, or a netlist (similar to netlist 800 of FIG. 8A) for the circuit. For example, an OrCAD generated data base may be employed. In some embodiments, the implementation in FIG. 4 uses a .net (netlist file) 401.

b. Based on the type of product circuit desired, a suitable substrate from a family of available configurable substrates may be selected. To specify this information, the layout information for the selected substrate 506 may be provided to the tool. Such layout information may be for example, active and passive footprint locations on the configurable substrate, centralized and distributed matrix pad locations, pad interconnections, and substrate layer interconnections. For the implementation described in FIG. 4, a sample input file 402 is shown in FIG. 8B.

c. According to certain aspects, each active device has a file noting the bond pad locations on the die 504 for that device. This information may also be important for the tool 102 to make interconnections between the active device and any centralized/distributed matrix pads. This information can be provided as an input to the tool, for example, in the form of an excel file containing the die and pad layout information of the Op-Amp (or any similar active device) that serves as the data base for active components of the circuit. An example description of this input 403 used in the implementation of the methods and tool of the present disclosure is shown in FIGS. 9A-9C. In some embodiments, this bond pad information is provided in the datasheet for a component, or in other documents available from the active component die's vendor.

d. Depending on the ability of a schematic capture tool to classify different connections into groups such as power, input, output etc., a data base may be necessary, which may be in a spreadsheet format that contains category descriptions of the vertices 503 of a graph constructed from the input circuit 101. This input may be used, for instance, when the schematic capture tool itself cannot generate the category or types of information or the information has not been put into the schematic by the user. For some implementation, such as with respect to FIG. 4, an input 'vertex assignment' 404, which is described with respect to FIG. 9C, is used. This spreadsheet may be interactively provided by the user while translating the data base of the custom schematic capture into an intermediate data base file that is used to construct a graph representation of the circuit. In some embodiments, the spreadsheet contains Input, Output, Power and any more columns in which the user will enter the names of the connections ("Net") as defined in the schematic.

e. The tool may have additional inputs for example, user/manufacturer defined constraints 505 such as critical interconnections and bond machine specifications. Some connections may be, for example, but not limited to, input signals, noise sensitive signals, low voltage signals or connections that need to be made initially.

Continuing to refer to FIG. 5A, in some embodiments, after parsing each of the inputs 501, a portion of the tool 102 creates an intermediate data file 507 that has the relevant data to create a graph data-type for the circuit 508. According to further embodiments, the implementation of the methods and tool of the present disclosure described in FIG. 4 use this process in item 414, a python language file (Net2Graph.py).

In some embodiments, in order to generate the graph data-type for the circuit 101, the tool 102 uses a set of defined objects and methods. "Objects" can be specialized data structures (for example, a graph) that allow definition of a circuit component or entity and its attributes, physical, electrical, or otherwise, in an object-oriented programming environment like python. "Methods" can be functions or operations that can be performed on or between (involving) the objects. In certain aspects, objects and their related methods are defined in a class file. For the implementation of the functions and tool described in FIG. 4, Edge_weighted_graph and Layout 415 are the two API class files in which the object definitions and methods can be implemented. In certain aspects, a class file will contain the classes for a vertex and a graph of vertices along with methods operating on the graph data-type and the vertex data-type. For example, in the implementation in FIG. 4, Edge_weighted_graph could contain the definitions for the classes for vertex, edge and graph.

Further referring to FIG. 5A, the intermediate data file generated at the end of 507 may be a consolidated file that contains all the information needed to form a graph data structure of the input circuit. This file could be the output of the program file Net2Grapg.py 414 described with respect to FIG. 4. An example illustrating a portion of an intermediate file for this implementation is shown in FIG. 10, item 1001. In some embodiments, the intermediate file is input to a method that parses it and forms a graph data structure representing the input circuit 101. In certain aspects, the graph is analyzed and processed to eliminate all duplicate paths, loops, and missing connections, and all the paths of the graph are extracted.

Figure 5B:
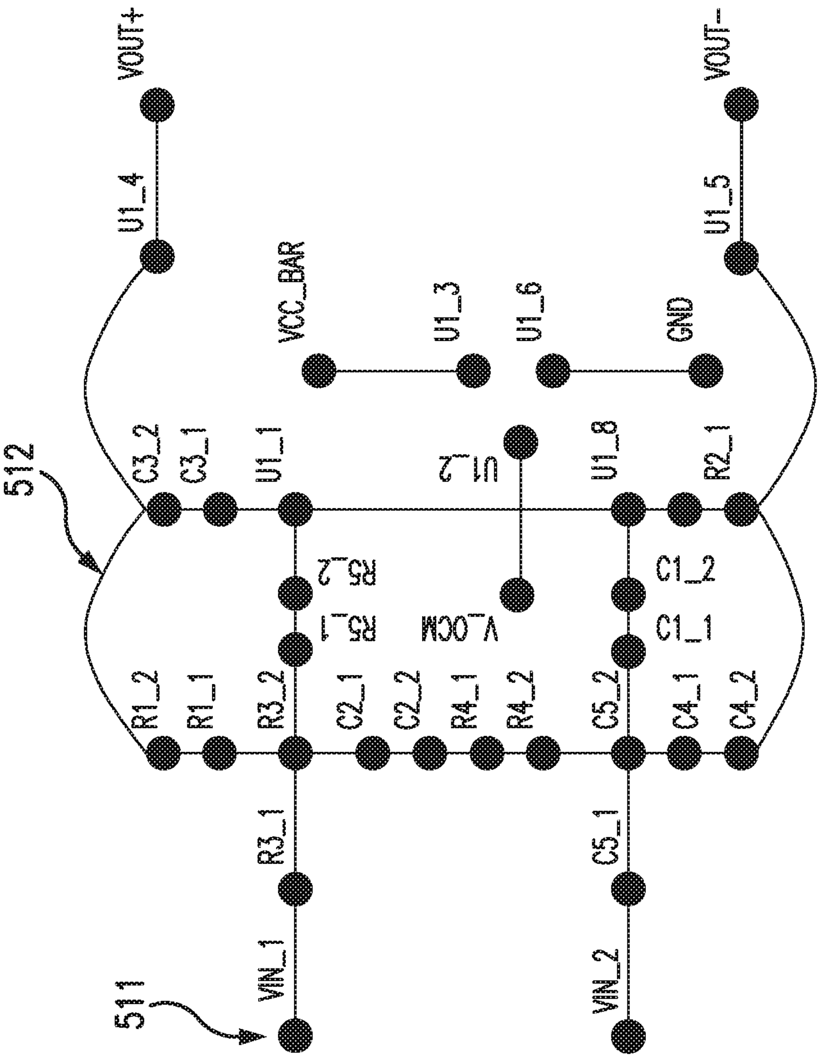
FIG. 5B is a diagram of a graphical representation of a circuit according to some embodiments.

According to some embodiments, FIG. 5B depicts a simplified graph data-type 520 (represented in step 302 of FIG. 3) used to represent the circuit 101 of FIG. 1. In this example, in order to create the graph data-type of the circuit 520, the circuit 101 is analyzed and deconstructed into component interconnections 512 ("edges") between component pads 511 ("vertices"). In this example, pads may include wire bond pads, die pads, surface mount device pads or other similar connection items on a substrate. The edges can have weights that have a value to represent interconnections between vertices or serve as a metric for optimization purposes. For example, the weight can represent the length of the bond wire between the two pads. In some embodiments, the tool uses this representation of the interconnections between the components to make it possible to run functions/methods on the circuit. In addition, the tool 102 may also need to know what pads are associated with each component in order to properly make those interconnections, and accordingly, may need to know the layout of the customizable substrate and its associated pads and their locations.

In some aspects, a path can be a sequence of edges (interconnections) connecting a sequence of vertices (pads). The goal of some disclosed processes is to convert a complex intricate circuit into a minimalistic discrete set of paths that contain all the interconnections of the circuit. In the implementation of the methods and tool of the present invention described in FIG. 4, the processing of the intermediate file to produce a graph structure of the input circuit could be done by the program file Graph2route.py (416) by traversing the graph. This could be done, for example, using "depth first" traversing method. Graph traversing may be understood as a way to walk through the vertices of the paths representing the circuit one path and one component at a time. Once all possible paths can then be extracted from the traversal, compared with each other, and trimmed to eliminate duplicate paths, making sure each interconnection of the circuit occurs only once in all the paths. This set of paths can be the edge weighted graph 508, which can serve as input to the part of a tool that determines the wire bonding pattern of the connection matrix. This can be used, for instance, for 201 of FIG. 2A and the distributed matrix 208 of FIG. 2A. In some embodiments, in an implementation of the methods and tool described in FIG. 4, a program file Graph2route.py (416) develops and generates the process for optimal placement and routing of the input circuit on the configurable substrate.

In some embodiments, the description of a set of classes, the objects described above and methods defined that may be used for the tool 102 as noted in the description of FIG. 5A are defined in the Edge_weighted_graph file 415 of FIG. 4. In some embodiments, the Edge_weighted_graph file 415 comprises a Vertex class and a Graph class, as listed below. The description of a set of classes, the objects, and methods used by the tool 102 for component layouts may be defined in the Layout file 415 of FIG. 4. In some embodiments, the Layout file 415 comprises the Pad class, Ulayout class, and Matrix class, as listed below. The description of a set of classes, the objects and methods used by the tool 102 can be defined in the files Edge_weighted_graph and Layout (415) and used, for instance, in the implementation of the methods and tool described in FIG. 4. Descriptions are provided below in accordance with some embodiments:

1. Vertex: The Vertex class defines a vertex (pad) in the graph. In some non-limiting embodiments, the Vertex class has the following attributes (attributes are properties of the objects):

(1) attribute id is the name of the vertex, (2) adjacent list maintains all the adjacent vertices that are connected to the vertex, (3) type attribute contains the type of the vertex which can be 'P' (power), 'C' (passive), 'F' (floating vertex) and 'U' (amplifier/active device pad vertex) and (4) no_pass refers to the number of passives the vertex is connected to. In some embodiments, the above noted attributes are defined as: (1) self.id=node, (2) self.adjacent={ }, (3)_self.type=type, and (4) self.no_pass=0.

In some embodiments, Vertex uses the following methods:

(1) a method that displays all the adjacent vertices of the vertex; (2) a method that adds neighbors to the vertex; (3) a method that returns all the connections (edges/paths) of the vertex; (4) a method that returns the type of the vertex; and (5) a method that returns the weight of the line or edge that connects a vertex to its neighbor. In some embodiments, the above noted methods are defined as: (1) def_str_(self); (2) def add_neighbor(self, neighbor, weight=0); (3) def get_connections(self); (4) def get_type(self); and (5) def get_weight(self, neighbor).

2. Graph: The Graph class defines the graph using the vertex class. In some embodiments, the Graph class has the following attributes:

(1) attribute vert_dict is a set that maintains all the names of the vertices that are in the graph and (2) num_vertices keeps track of the number of vertices present in the graph and is initialized to 0. In some embodiments, the above noted attributes are defined as: (1) self.vert_dict={ } and (2) self.num_vertices=0.

In some embodiments, Graph uses the following methods or functions:

(1) a method that performs a defined process on all the vertices of the graph, for example, method that iterates over all the vertices of the graph; (2) a method that is used to add a vertex to the graph taking the name of the vertex node and type of the vertex (described above) as inputs; (3) a method that is used to return the vertex object that is needed elsewhere; (4) a method that is used to add a bi-directional edge between 2 vertices from the vertex frm and to the vertex to and the weight of the edge is initialized to 0; (5) a method that returns all the vertex names in the graph; (6) a method that returns the number of paths through the vertex src; (7) a method that returns all the paths when the graph is put through a depth first traversal algorithm; (8) a method that takes the set of all the extracted paths from the circuit and returns a trimmed version of the set of paths with no duplicate paths; (9) a method that takes the trimmed version of set of paths retuned from the foregoing method along with the source vertex to return all the connected paths from the source ignoring the passives; (10) a method that returns all the vertices of a specific type in the graph; (11) a method that takes the set of trimmed paths as input to give out all the processed connected paths in a format that can be understood by the methods and classes that involve further steps like determination of placement and routing. In some embodiments, the above noted methods are defined as: (1) def_iter_(self); (2) def add_vertex(self, node, type); (3) def get_vertex(self, n); (4) def add_edge(self, frm, to, cost=0); (5) def get_vertices(self); (6) def no_of_paths(self, src); (7) def get_paths(self, src); (8) def trim_paths(self, paths); (9) def Connects(self, paths_trimmed, src); (10) def Vertex_types (self, typ); and (11) def Route_table(self, paths_trimmed).

3. Pad: Pad class defines a pad object. In some embodiments, the Pad class comprises the following attributes:

(1) attribute type stores the type of the pad; (2) a pad can be the same number of types as the vertex in the graph class; (3) adjacent attribute stores all the adjacent pads that the pad is connected to; (4) attributes xmin, xmax, ymin ymax store the coordinates of the pad; (5) the assign attribute stores the vertex name the pad is assigned to; (6) assigned is a Boolean variable that returns true if the pad has been assigned; (7) attribute block_size is the size of the footprint of a bond wire that the pad would be connected to, by default, it is 50 microns; and (8) max_blocks attribute stores the maximum number of bond wires that can be connected to the pad. In some embodiments, the above attributes are defined as: (1) self.type=type; (2) self.pad_name=pad_name; (3) self.adjacent=[ ]; self.blocks_occupied=[ ]; (4) self.xmin=Decimal (xmin), self.ymin=Decimal(ymin), self.xmax=Decimal (xmax), self.ymax=Decimal(ymax); (5) self.assign_vert=[ ]; (6) self.assigned=False; (7) self.block_size=Decimal (block_size); self.ylen=(Decimal(ymax)−Decimal(ymin))/self.block size, self.xlen=(Decimal(xmax)−Decimal(xmin))/self.block_size; and (8) self.max_blocks=int(self.ylen)*int (self.xlen).

Figure 12:
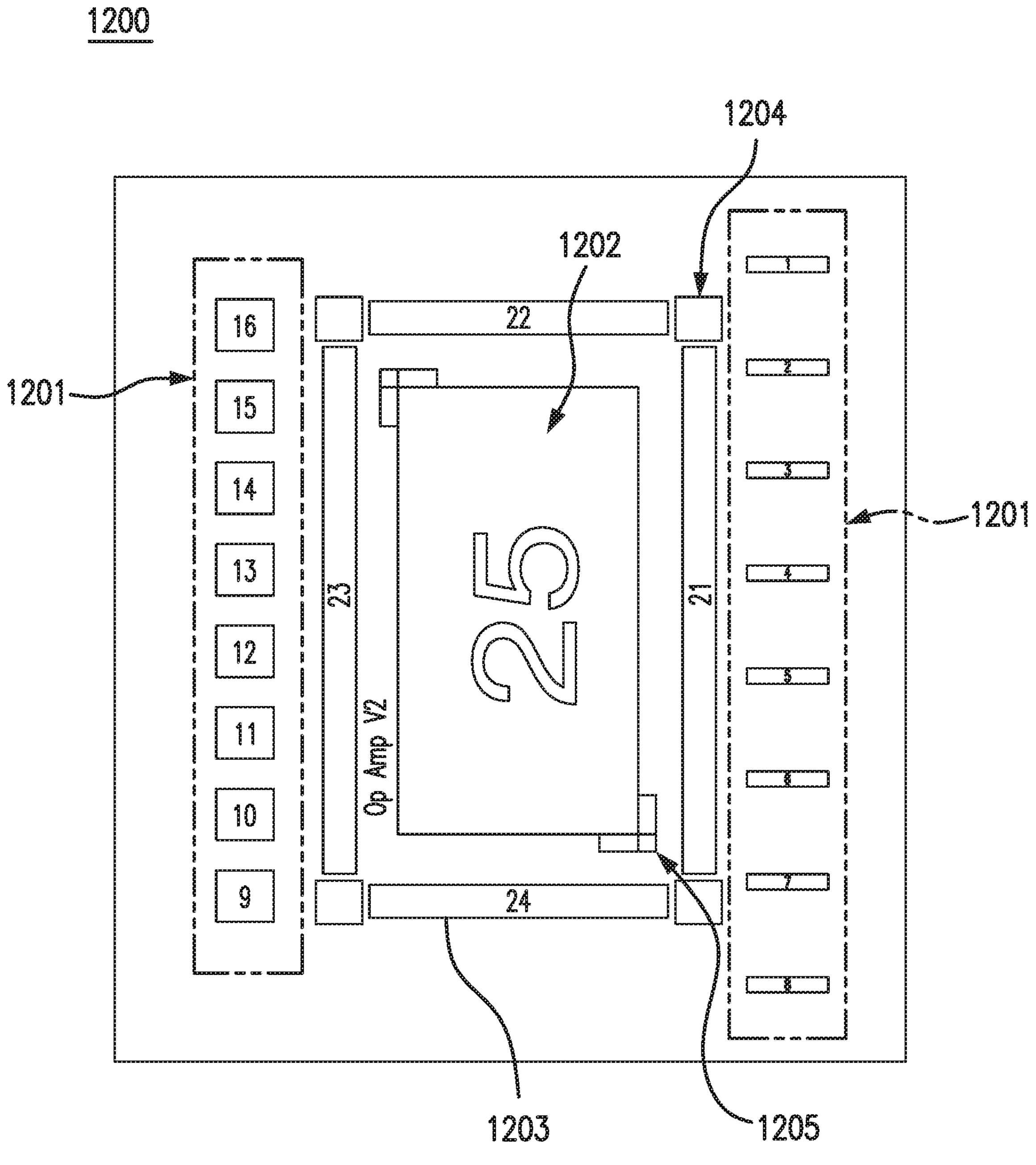
FIG. 12 is a diagram of a portion of a substrate according to some embodiments.

Pads: The pads are characterized by the boundaries xmin, xmax, ymin and ymax similar to the description of bond pads found in component datasheets. FIG. 12 shows an example of a footprint of an Op Amp landing pad layout for the matrix configuration described in FIG. 2. The die will go on the $25^{th}$ pad of the layout.

Blocks: Each pad is divided into blocks, one of which can accommodate one bond wire connection. The numbering convention 660 is also shown in FIG. 6C.

In some embodiments, the Pad class uses the following methods or functions:

(1) a method that returns the pad_name attribute of the class pad; (2) a method that can be used to add a bond wire connection between the pad and a neighbor at the block number which is also an input; (3) a method that returns all the connections of the pad in a list and the corresponding block numbers to which they are connected to; (4) a method that returns type of the pad; (5) a method that returns id of the pad; and (6) a method that returns the [xmin, ymin, xmax, ymax] (coordinates with respect to origin) of the pad given the block number. In some embodiments, the methods or functions are defined as: (1) def_str_(self); (2) def add connection(self, neighbor, block_no); (3) def get_connections(self); (4) def get_type(self); (5) def get_id(self); and (6) def get_block(self, block_number).

4. Ulayout: This class creates a layout for an active device for example, an OpAmp, given the origin coordinates for the matrix layout configuration described in FIGS. 2A and 2B. For the OpAmp example, there are 25 pads in all as depicted in FIG. 12. In this embodiment, there are 25 pads in all, but it can be customized to have any number of pads that the active component requires. When initialized, the Ulayout class will create a total of 25 pads with corresponding boundaries with respect to the origin. Along with these, the initialization also calculates the appropriate position of the die given the sizes in both dimensions and from the information extracted from the excel sheet creates the appropriate number of pads those will be on the die placed on the layout. This gives the user the freedom to choose the size of the die and supply the bond pad specifications so that the bond pads are created at the appropriate place on the layout.

In some embodiments, Ulayout class has the following attributes:

(1) attributes xmin, ymin are the origin of the layout; (2) attributes die_size_x and die_size_y are the dimensions of the die that will go on the layout; (3) attributes die_min_x, die_min_y, die_max_x, die_max_y are the corner coordinates of the landing pad for the die measured from xmin and ymin; (4) attributes die_pad_center_x, die_pad_center_y are the coordinates of the center of the landing pad for the active component die; (5) attributes die_xmin, die_ymin, die_xmax, die_ymax are the corner coordinates of the die placement on the landing pad; (6) attribute 'p' is the array of pad objects in the footprint; and (7) attribute 'pad_dict' is the dictionary of pads extracted from the pad layout of the active component.

In some embodiments, the above attributes are defined as: (1) self.xmin=xmin, self.ymin=ymin, self; (2) die_size_x=die_size_x, self.die_size_y=die_size_y; (3) self.die_min_x=xmin+0.95, self.die_min_y=ymin+1.15, self.die_max_x=xmin+2.75, self.die_max_y=ymin+4.45; (4) self.die_pad_centerx=(self.die_max_x+self.die_min_x)/2, self.die_pad_center_y=(self.die_max_y+self.die_min_y)/2; (5) self.die_xmin=die_pad_center_x−self.die_size_x/2, self.die_xmax=die_pad_center_x+self.die_size_x/2, self.die_ymin=die_pad_center_y−self.die_size_y/2, self.die_ymax=die_pad_center_y+self.die_size_y/2; (6) self.p=[ ]; and (7) self.pad_dict=[ ].

In some embodiments, Ulayout uses the following methods or functions:

(1) a method that connects two pads frm and to with the shortest bond wire possible—the algorithm involved is described in a later section of this document; (2) a method that returns a Boolean true if there is a connection between the two pads frm and to; and (3) a method that takes the name of the pad as a string and returns the pad object corresponding to the name given as input. In some embodiments, the above noted methods are defined as: (1) def connect(self, frm, to); (2) def is_connected(self, to, frm); and (3) def Ret_pad(self, name).

5. Matrix: This class initializes the pads of the matrix for the configuration described in FIG. 15 using the pad class.

In some non-limiting embodiments, the Matrix class has the following attributes: (1) 'xmin' and 'ymin' are the origins of the whole layout while 'mxmin' and 'mymin' are the origin coordinates of the matrix pads; (2) 'Pads_assigned' is a list that keeps track of all the assigned pads of the matrix; (3) 'pad_dict' attribute is a list of the names of all the pads in the matrix; and (4) 'm' is the array of 45 pads of the matrix. All of the above noted attributes serve as an example and can be modified to fit different positions and layouts of the matrix. In some embodiments, these attributes are defined as: (1) self.xmin=xmin, self.ymin=ymin, self.mxmin=xmin+3.5, self.mymin=ymin; (2) self.pads_assigned=[ ]; (3) self.pad_dict=[ ]; and (4) self.m=[None]*45.

In some embodiments, the Matrix class uses the following methods or functions:

(1) a method which returns all the pads of one category specified by type; (2) a method which gives out a Boolean true or false depending on whether the pads frm and to are connected; (3) a method which takes the matrix layout, the trimmed disjointed paths output from the methods in the Graph class and the graph that describes the circuit and assigns each of the vertices in the graph to one of the matrix pads. This assignment is done using the method of pad assignment described earlier; (4) a method which connects two pads in the matrix but uses a different algorithm to the one used in the Ulayout class; (5) a method which assigns the pad's name to be the name input into the method; and (6) a method which returns the pad object when the name of the pad is given as input. In some embodiments, the methods or functions of the Matrix class may be defined as: (1) def Ret_pad_cat(self, type); (2) def is_connected(self, to, frm); (3) def Matrix_assign(self, paths, graph); (4) def connect (self, frm, to); (5) def Assign(self, pad, name); and (6) def Ret_pad(self, name).

Continuing to refer to FIG. 5A, similar to the classes that define all the attributes and methods of a graph, classes for layout of the connection matrix and active components (for example, Op-Amps) and other components are used by the tool to represent the layout of all the components on the substrate in some embodiments. The classes that define the layout of the substrate are initialized using the layout information input 506, and the initialization process can determine the position and attributes of various component footprints or locations in the layout. Although one example of a component that goes on the active device die pad layout is an Op-Amp, active components are not restricted to an Op-Amp. An active device may be, for instance, one that has input signals, output signals, and requires power and has a size or footprint that fits into the size of the configurable component layout pad ("landing pad").

Figure 6A:
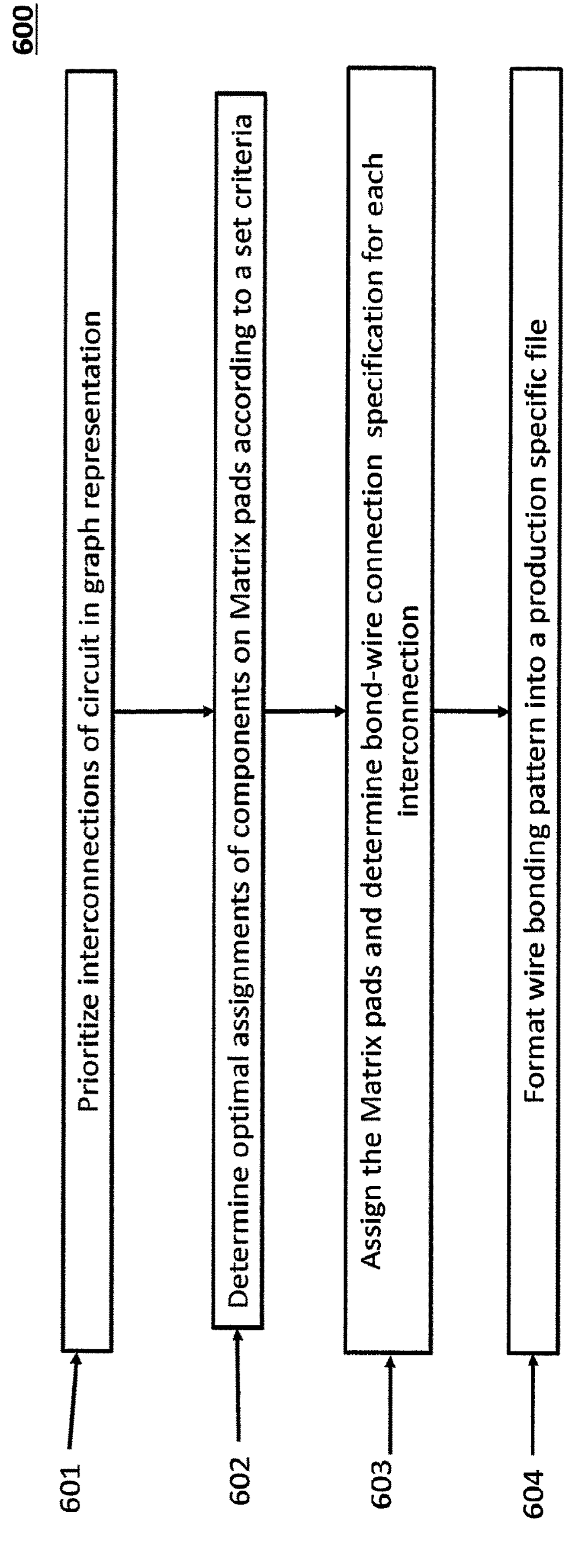
FIG. 6A is a flow diagram that illustrates a process according to some embodiments.

Referring now to FIG. 6A, a process flow diagram 600 for generating a wire bond machine specific interconnection data file is depicted. This can be done, for instance, by using the paths generated by the graph representation created by the tool 102 described with respect to FIG. 5A. In some embodiments, the assignments of matrix/power pads and routing of bond wires on the configurable substrate's matrix can have one or more optimization criteria. In step 601, the interconnections may be prioritized (optimized) in the graph representation. In step 602, optimal assignments of components on matrix pads are determined according to a set of criteria. In some embodiments, the prioritized interconnections are used to determine the optimal component assignments. In some embodiments, the optimization criteria may be based on, for example, minimizing interconnection distances, avoiding any overlapping of bond wire interconnections, optimizing use of the matrix pad locations nearest an active circuit component location, minimizing bond wire length, maximizing performance, minimizing usage of the bottom side of the substrate for component placement, minimizing bond wire sizes, optimizing for best overall power management, minimizing cost, minimizing power, selectively minimizing noise components, and minimizing component cross-talk, among others. In step 603, the matrix pads are assigned and bond-wire connection specification is determined for each interconnection. In step 604, a wire bonding pattern is formatted into a production specific file. In some embodiments, the steps 601-604 described in FIG. 6A are implemented in Graph2route.py programming file in the implementation of the methods and tool described in FIG. 4. For instance, in some embodiments, the tool in FIG. 4 prioritizes the interconnections according to a predefined order incorporated inside its methods for pad assignment 411 and determines the assignment of pads of the connection matrix and the distributed matrix using the predefined criteria in method 411. The bond wire connections of the circuit are then made 603, similar to function 412 in FIG. 4, according to the assignment information in 602, similar to function 411 in FIG. 4. For the implementation in FIG. 4, the bond wire connections can be formatted into a netlist file 413 that a wire bonding machine may require.

In some embodiments, unique methods with different objectives can be used to optimize one or more criteria in step 602. One example objective for the matrix configurations depicted in FIG. 2A would be to provide a routing pattern such that the total length of the bond wire is minimized. In this case, minimizing the total bond wire length involves placing connected circuit components at appropriate places such that the distance between their corresponding matrix pads is minimized. For the matrix configuration in FIG. 2A, all the bond wire connections in the matrix can be made with vertical bond wires 104 shown in FIG. 1. In some embodiments, if the bond wire length is too long, the connection is either broken up into two bond wires connected using an intermediate matrix pad or one of the vertical matrix pads at the center of the matrix can be utilized by making horizontal bond wire connections from the matrix pads that are connected to the components.

In some embodiments, and further referring to FIG. 6A, the method for optimal placement and routing of the bond wires will depend on the configuration (layout) of the connection matrix.

Figure 6B:
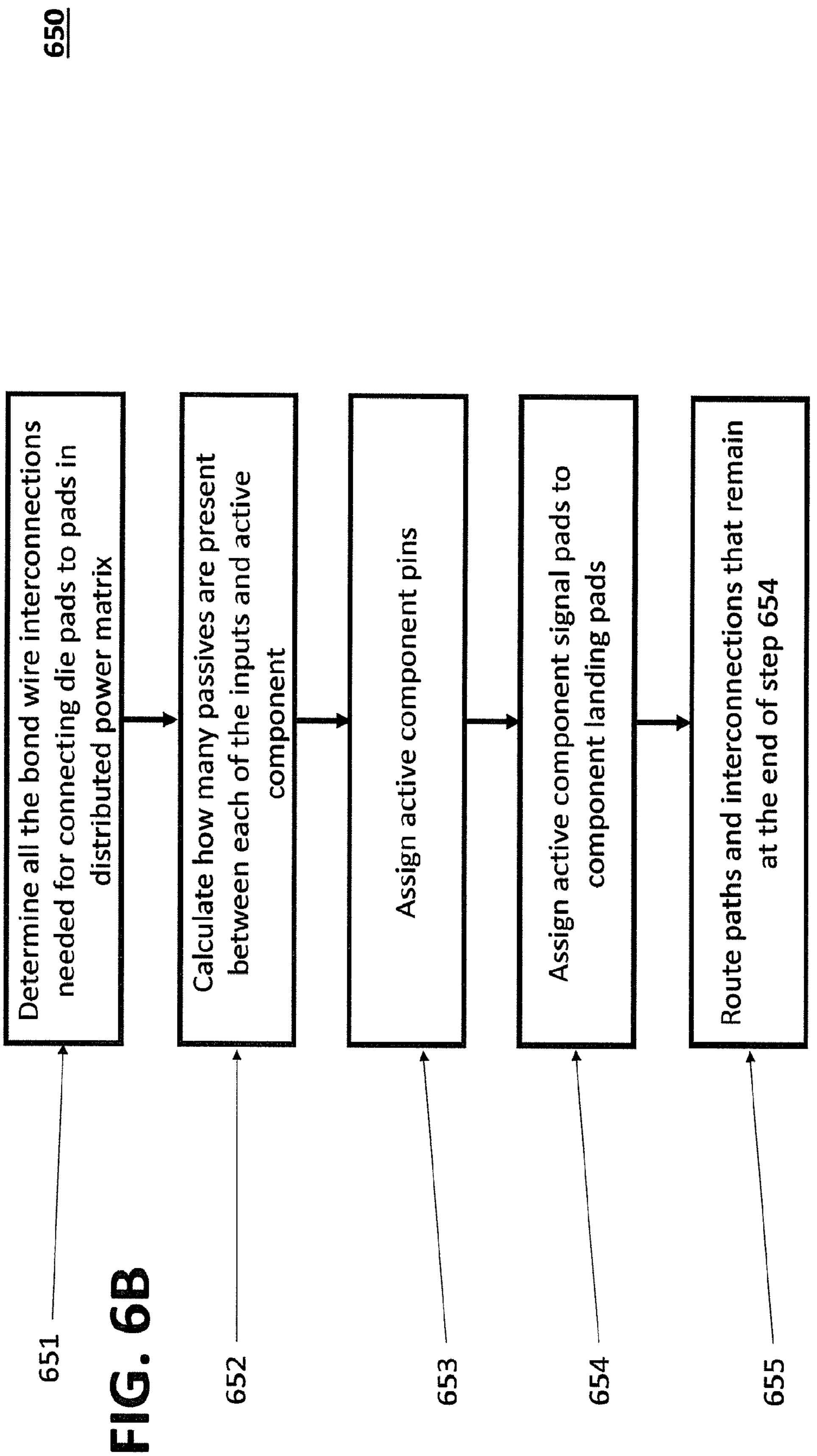
FIG. 6B is a flow diagram that illustrates a process according to some embodiments.

According to some embodiments, FIG. 6B illustrates a process 650 for assigning the matrix connection pads to circuit component pins and thereby deciding the placement of the components that serve as local constraints for a matrix configuration, such as described in FIGS. 2A-B. In certain aspects, the function 411 in FIG. 4 can implement the steps of process 650 to determine assignment information of the components to the pads in the customizable substrate described in FIG. 2A.

According to embodiments, the steps of process 650 can vary according to user defined criteria that could include routing specific signals first or having specific pin assignments. In step 651, the process 650 can start with the power connections needed for the active components and determine all the bond wire interconnections needed for connecting the die pads to the pads in a distributed power matrix, such as matrix 1203 around the die landing pad 1202. In step 652, the number of passives that are present between each of the inputs and the active components is calculated. For instance, for the matrix interconnections, the process 650 starts with the inputs and calculates the number of passives are present between each of the inputs and the active component pins. Step 653 assigns the active component pins. According to some embodiments, this is done while leaving enough passive pads near the input pads for routing the inputs based on the information from step 652. In step 654, pad assignments of the active component signals can be spaced out to allow sufficient spacing between pins and sufficient numbers of passives close to each pin based on the requirement of the circuit. This spacing may be based on the number of pins on the active component in total that are connected to the matrix. In step 655, the process routes paths and interconnections that remain at the end of step 654.

In some embodiments, having prioritized paths and interconnections may be another constraint that can be added to the process 650, which can result in a local optimal solution, as described in relation to step 601 of FIG. 6A. Accordingly, the process may generate the wire bonding pattern that the bonding machine requires to build the circuit. The connection matrix pad to component pin assignments may decide the placement of the components on the SiP substrate. The placement data can be saved and output from the tool to become the input to a component placement machine. For the implementation of the method and tool of the present disclosure described in FIG. 4, the placement data can be part of the output netlist 413.

Further referring to FIG. 6A, in step 603, two matrix pads for the matrix configuration described in FIGS. 2A-B connected using bond wire can also be optimized, for example, based on the length of the bond wire. This example optimization based on the wire bond length is implemented in 412 of the tool described in FIG. 4 and is described in the following. That is, the optimization of bond wire length while connecting two matrix pads can be done by starting to divide each wire bond pad (or any other pad) into blocks of equal size as depicted in FIG. 6C.

According to some embodiments, FIG. 6C depicts one example of a wire bond pad that is divided up into blocks and their numbering convention that may be used by the design tool and method of the present disclosure (this is a convention that can be used in function 412 of the tool described in FIG. 4). In certain aspects, the size of each block is determined by the space each bond wire connection takes up on the pad when connected to the pad. The method for connecting two matrix pads can start by choosing the first block of the first pad. The distances to that block from all the blocks in the second (destination) pad are calculated, the block from the second pad with the minimum distance is selected, and distances between this block and all the blocks in the first pad are calculated. This may be done iteratively until the distance between the two blocks selected from each pad does not decrease anymore and each new iteration results in the same block numbers as the previous iteration. The blocks selected at the last iteration can be assumed to be the points of minimum distance between the pads. This will provide a type of optimized solution (shortest bond wire length) because the pads are convex and non-overlapping. If a bond wire connection obtained as a result of this method cannot be installed due to violation of design rule constraints such as maximum bond wire length or two bond wires crossing each other, one or more bond wire connections that are in conflict can be broken up and/or routed around each other to avoid violation of the design rules.

FIG. 6C depicts a portion of the connection matrix 204 shown in FIG. 2. Three landing pads of the connection matrix, 661, 671 and 681 are shown as "M_1", "M_2", "M_3". In this particular example, each of these three landing pads are wide enough to allow up to 8 wire bonds to be attached indicated by the eight equally sized wire bonding locations numbered 1 through 8. Four of these wire bonding locations are identified on landing pad "M_1" 661 as 662, 663, 664, and 666. Similarly, other wire bond locations are identified as 672, 673, and 674 on "M_2"; and 682, 684, 686 on "M_3". In this example, landing pads M_1 and M_3 are connected using wire bonding locations 662 and 682 with a bond wire 665. Similarly, landing pads M_1 and M_2 are electrically connected with a bond wire 675 from M_1 to M_2 using wire bonding locations 663 and 673 and a second bond wire 685 from M_2 to M_3 using wire bonding locations 674 and 684. In this example, it should be noted that the two connections between M_1 and M_2 are shorted together as all 8 of the wire bonding locations of M_1 are electrically connected as is the same with all 8 bonding locations of M_2 and M_3 respectively. One additional bond wire is shown connecting M_1 and M_3 695 using wire bonding locations 666 and 686.

Figure 7:
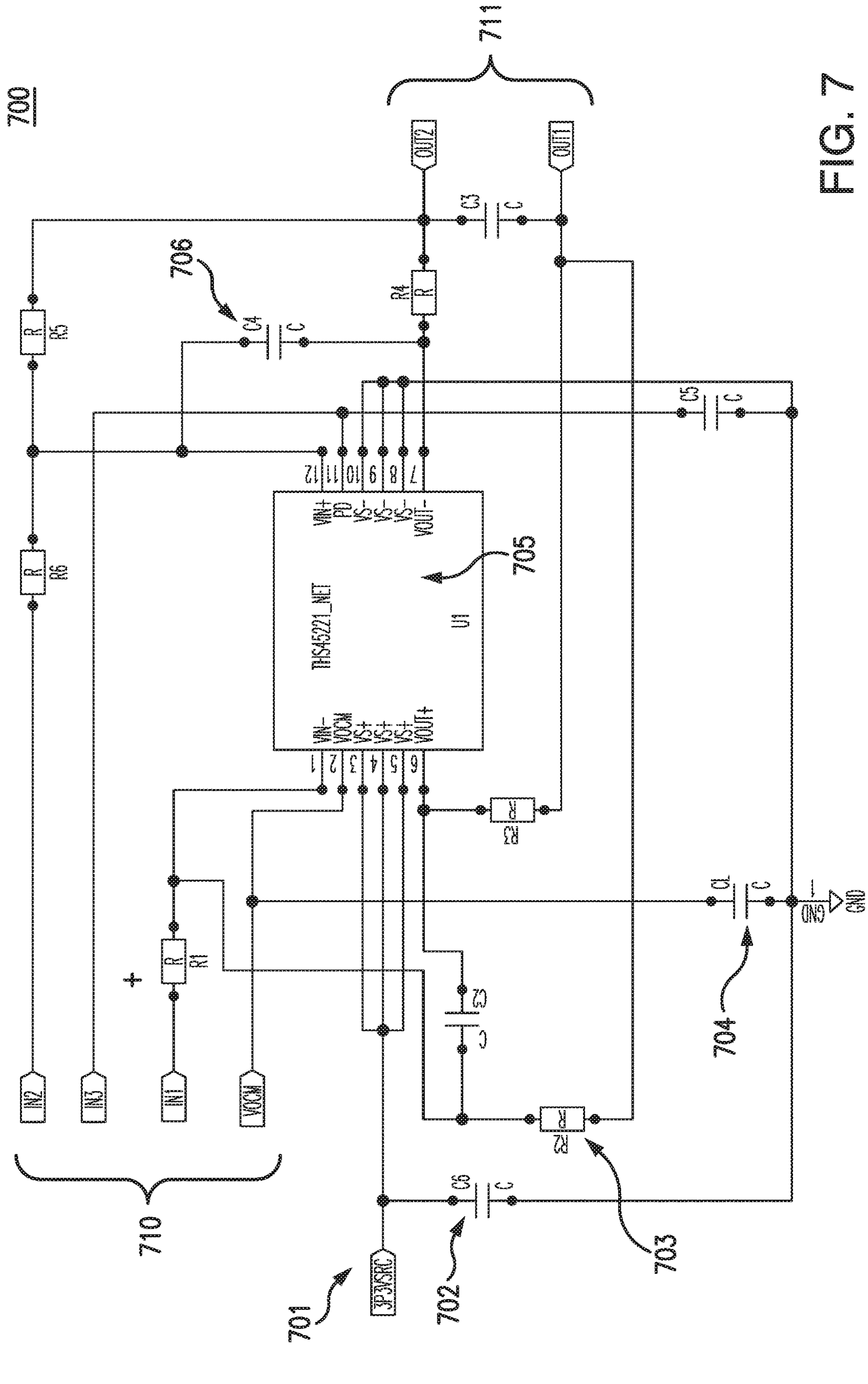
FIG. 7 is a circuit schematic according to some embodiments.

FIG. 7 depicts a simple schematic of a circuit 700. In certain aspects, circuit 700 is similar to circuit 101 shown in FIG. 1 and circuit 210 shown in FIG. 2B. In this example, the circuit 700 comprises an active device 705, a plurality of passive devices, an input 701, outputs 711, and supply voltages 710. In an embodiment, the passive devices include capacitors 702, 704, 706 a resistor 703. This circuit schematic could form the inputs to the tool 102 and the resulting results and/or outputs depicted in FIGS. 8-13.

Figure 8A:
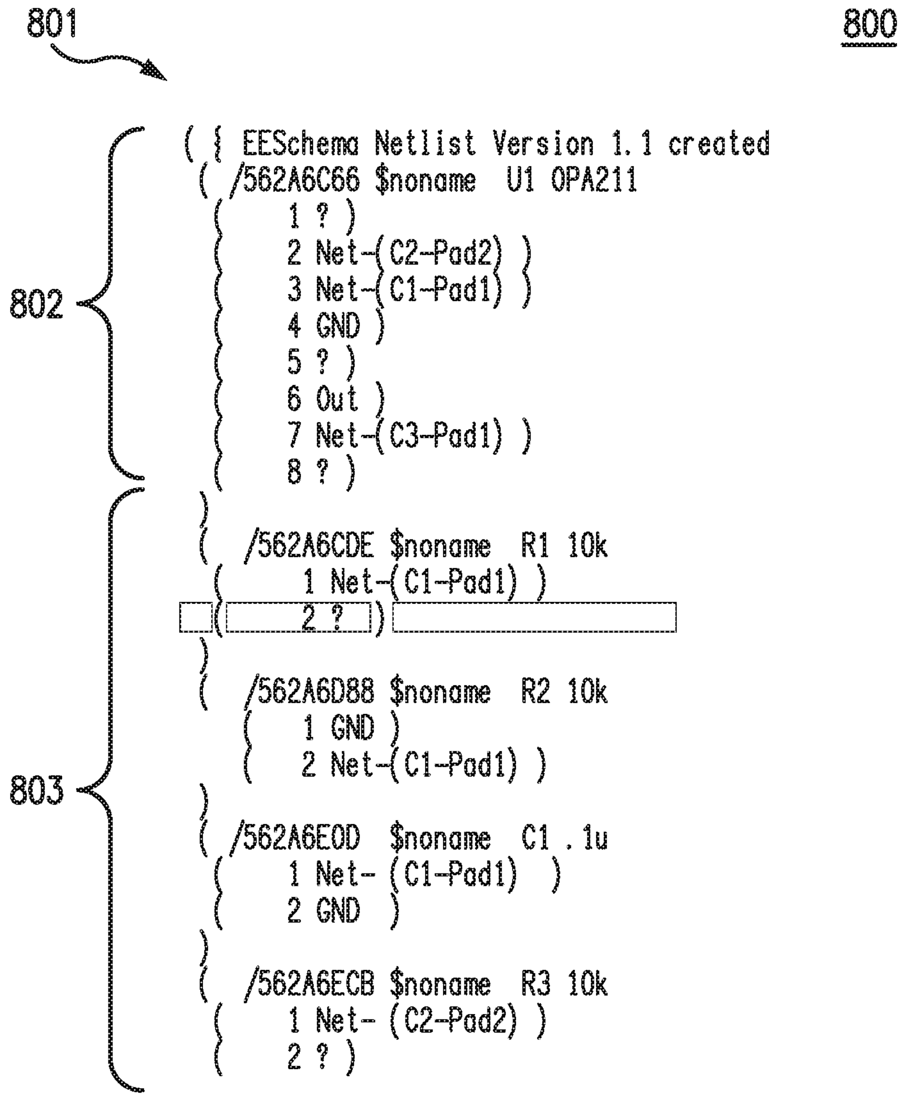
FIG. 8A illustrates a database file according to some embodiments.

FIG. 8A depicts a portion of a netlist database 800 associated with the circuit 700 described in FIG. 7 according to some embodiments. The netlist 800 comprises a header 801 and identifying information 802 illustrates connection information for the three passive components C2, C1, C3 connected to three of the eight pins of a circuit component U1 OPA 211, while 803 illustrates the connection information for four passive components R1, R2, C1, R3. In this example, FIG. 8A only shows a portion of the netlist 800 and the entire netlist 800 may be longer.

FIG. 8B shows the layout information 810 (similar to that from layout information 506 of FIG. 5 and layout information 402 of FIG. 4) of active and passive footprint pad locations for the implementation described in FIG. 4, which is based on a substrate similar to that of FIG. 2A. In an embodiment, the active, passive and matrix pads are separately listed with headings NN-Active, NN-Passive and NN-Matrix (811, 813 and 814). The separate listing with headings for the active, passive and matrix pads is for the program Net2Graph.py (614) to parse the file and classify the pads as belonging to the particular category. Each line 812 of the layout information 810 contains the x_min, x_max, y_min and y_max coordinates of the pad which indicate the boundaries of the pad in x and y directions.

FIG. 9A depicts an example of the die pad information 900 (similar to that illustrated by die pad information 504 of FIG. 5 and die pad information 403 of FIG. 4) from a component datasheet for a component 910 according to some embodiments. In this example, the table 901 identifies the function (input, output, voltages) of each die pad in column 902 and the pad locations in columns 904-907 of the seven pins listed in column 903 for the component 910.

FIG. 9B depicts the die layout of the example of FIG. 9A. The overall size of the component 910 is depicted by measurements 913 and 912. The pin numbers and relative locations are also depicted by representative pin "one" 911. The seven pin numbers depicted in the die layout of FIG. 9B can correspond to the pin numbers listed in column 903 of FIG. 9A.

According to some embodiments, FIG. 9C depicts the vertex assignment information 920 (similar to that illustrated by vertex assignment information 503 of FIG. 5 and vertex assignment information 404 of FIG. 4), which can be an optional input to the tool described in FIG. 4. In an embodiment, the vertex assignment information 920 is necessary as an input if the schematic capture tool is unable to classify different parts of the circuit according to the tool specifications. FIG. 9C lists each vertex of the input circuit in FIG. 7 and the classification of the vertex. For example, the vertex 921 is declared as an Output. 922, 923 and 924 are some possible classifications of the vertices, where 922 'I' stands for Input, 923 'F' stands for Floating (neither input/output/power), 924 stands for Power.

FIG. 10 depicts a file used in some embodiments. For instance, a portion of the intermediate graph file 1000 (similar to that illustrated by intermediate graph file 406 of FIG. 4) generated by the above tool described in FIG. 4 with schematic circuit database 800 as input is represented by FIG. 10. In some embodiments, this file is parsed by Graph2route.py program 416 of the tool described in FIG. 4 to form a graph structure of the input circuit. The first line 1002 indicates the number of vertices in the graph. The listing of the vertices starts after the line that is named 'Vertex' (1002). The program 416 knows that there are 12 vertices in the graph for the input circuit after it reads the first line. After it encounters the classification 'Vertex' in a line, the program 416 reads the next 12 lines and instantiates 12 vertices with the names from each line of 1001. For example, a vertex named Net-(C4-Pad2) is created and is declared as type 'Floating' by the program 416. After reading all the vertices, the program looks for the number of components present in the input circuit which is listed in the line after the vertices 1004. In this example, the program 416 knows that there are 13 components in the input circuit after reading 1004. It then proceeds to read the next 13 lines to know the name of each component and the number of pins 1009 each component has. After reading all the component names, the program 416 looks for the classifier word 'Edge', 1006 which indicates that the listing below this identifier 1007 are edges of the graph of the input circuit associated with the component named 1007. Each line 1008 has a pin number of the component and the vertex it is connected to. After reading each line of this file, the program 416 adds an edge between previously instantiated vertices of the graph of the input circuit. The graph formation of the input circuit is complete after edges from all the components are parsed and added by the program 416.

FIG. 11 shows a portion of extracted paths 1100 from an example circuit, as similarly described in FIG. 7. Step 409 of the tool described in FIG. 4 also involves eliminating duplicated paths and trimming/shortening of paths to extract the disjointed set of paths. Two different sets of paths 1101, 1111 are illustrated in FIG. 11. For the paths in 1101, the columns 1102 depict the starting vertex and columns such as 1103 through 1108 depict the connections and components along an individual path. The top path starts at pin two of U1, connects to input voltage VoCM and C1, then C1 to Ground and Ground to pin nine of U1. A similar set of interconnections may be found in the circuit depicted in FIG. 7.

FIG. 12 illustrates an active device footprint 1200. This may be, for instance, on the substrate 203 of FIG. 2A. The pad data structure, described for instance in the Layout class file, is used to represent all the pads in the substrate layout. For example, an active component die pad layout for the matrix configuration described in FIGS. 2A-B can contain 25 pads in total with 16 of the pads 1201 connecting to the connection matrix 201 of FIG. 2A. Although one example of a component that goes on the active device die pad layout is an OpAmp, the present disclosure is not restricted to an OpAmp. Any active device that has input signals, output signals, requires power and has a footprint that fits into the size of the pad layout 1202 may be used, for example. The remaining 8 pads of which include 4 long ones represented as 1203 (identified as pads 21 through 24 in FIG. 12) and 4 small square ones in the corners as represented as 1204 (identified as pads 17 through 20 in FIG. 12). In certain aspects, the die pad 1202 identified with the number "25" is the pad on which the component die is mounted. These 8 pads surrounding the central pad 1202 on the die pad layout are used to power the component in an embodiment using bond wires with power rails from lower power layers of the SiP. In an embodiment, only the four pads like 1204 are part of a distributed power connection matrix, but could be expanded to include all 9 pads shown 1202, 1203 and 1204. In this example, the power connections are embedded in the data base that is generated by the design tool. Pad number 25 (1202) which serves as a base for the active component die can also be connected to the distributed power matrix pads which are represented by either 1203 or 1204, using the extensions in the corners 1205 if the die requires such a connection. The concept of a distributed connection matrix may be further used for other programmable interconnects beyond power distribution.

FIG. 13 depicts a file used in some embodiments. For instance, file 1300 can depict an example of a portion of the formatted file 413. This instruction file 1300 contains 2 different parts. The first part 1301 is the pad assignment instruction that the machine can identify using the identifier 1306 ('NN-ASSIGNMENT'). Each line for example, 1307 of this part of the input file contains a vertex 1309 and the associated pad object 1308 of the tool described in FIG. 4. As shown in FIG. 13, the pad objects are named with D and M as prefixes indicating that the pad object belongs to the distributed ("D") and the central ("M") connection matrix respectively. The second part of the file 1300 lists the interconnections between the assigned pads one per each line. For example, line 7 indicates that pad R6_2 1302 and U1_12 1303 are connected. The numbers 1304 and 1305 indicate the locations of the placement of the wire bond connection on the respective pad. For example, line 8 of 1300 indicates that pads 3P3VSRC and U1_3 are connected at wire bond location 1 of pad 3P3VSRC and wire bond location 1 of pad U1_3 respectively.

Referring to FIG. 4, after extracting paths and initializing the layout of the substrate as described in functions 409 and 410, the design tool next makes the pad-vertex assignment by setting the total wire bond length used to construct the circuit as the optimization criteria. In some embodiments, other optimization criteria may be used for the pad-vertex assignment. After a local solution for this optimization problem determining the interconnections 412 of pads in the matrix is obtained, these interconnections are formatted into a wire bond machine specific instruction file 413 that serves as the machine's input. In some embodiments, other machines may be used to connect the pads based on the instruction file 413. For example, the machine may be configured connect the pads using at least one of: zero ohm resistors, printed or screened insulator, and screened or printed conductors.

According to some embodiments, components are placed on one or more pads of a connection matrix comprising an array of landing pads and the one or more pads are interconnected using bond wires between those pads.

Figure 14A:
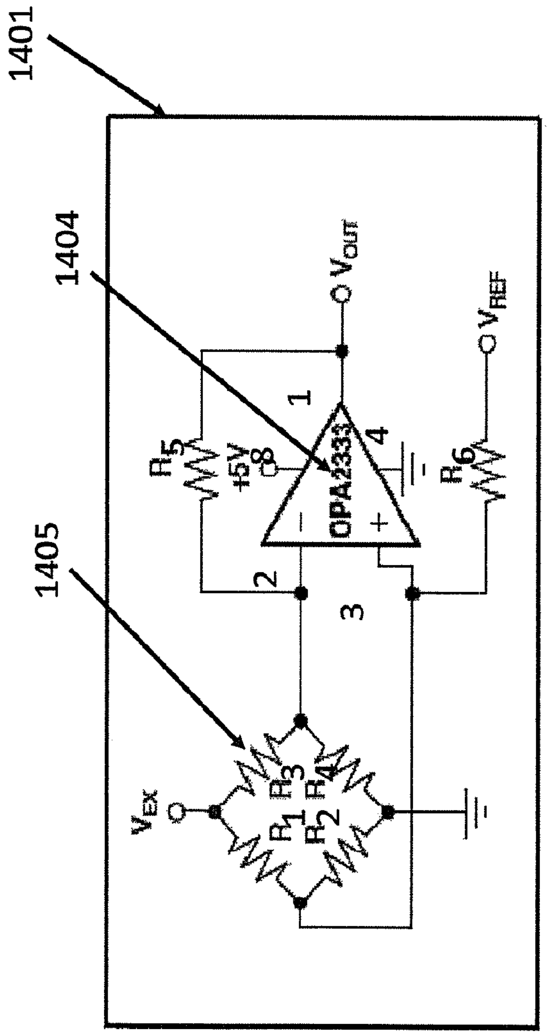
FIG. 14A is a diagram of a circuit schematic according to some embodiments.
Figure 14B:
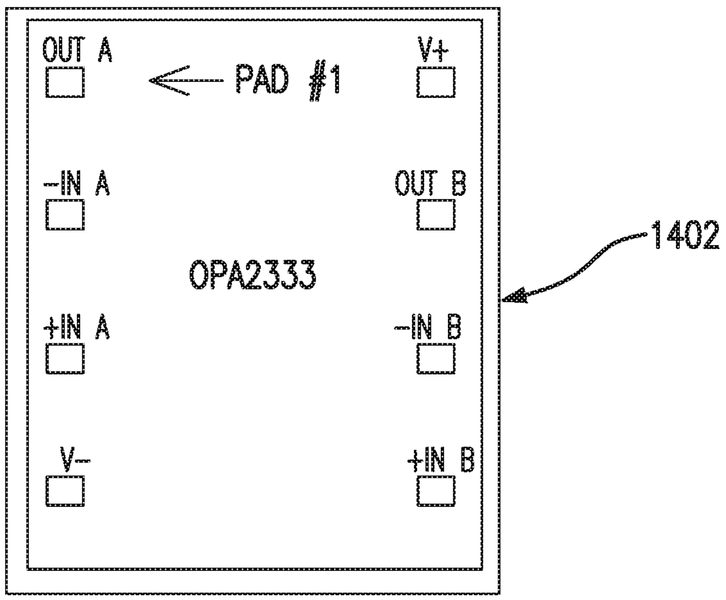
FIG. 14B is a diagram of die pad information of a circuit according to some embodiments.

FIG. 14A illustrates the schematic of a circuit 1401 using an integrated circuit 1402 and further using a bond pad placement table 1403. In this example, the circuit 1401 comprises an Operational Amplifier (OpAmp) 1404 and a wheatstone bridge 1405 made up of four resistors, R1, R2, R3 and R4. FIGS. 14B and 14C illustrate the layout for the OpAmp and the bond pad coordinates for the OpAmp, respectively. This circuit may be laid out using a substrate with a configurable connection matrix arrangement. Circuit 1401 may be processed as described with respect to FIG. 3 and the alternative methods described with respect to FIG. 4. In some embodiments, the schematic or the netlist associated with the circuit of FIGS. 14A-C is input to the tool along with other inputs such as a layout description of the potential component locations on the SiP substrate, user/manufacturer specifications and other specific inputs that the tool requires. As described with respect to function 407 of FIG. 4 and related descriptions, the tool may use a graph datatype to represent the circuit in its environment. As described with respect to process 409 of FIG. 4 and related descriptions, the tool extracts all the paths of the circuit 1401 after it acquires the circuit description inputs and the required information for component assignment and graph formation. In this example, the tool performs a pad-vertex assignment with the extracted paths as described in functions 410-411 of FIG. 4 and related descriptions, in which the vertices representing different connections of components of the circuit are assigned to matrix pads based on various optimization criteria. The optimization criterion, for example, for the optimizing algorithm could be one or more optimization variables such as bond wire length, highest performance, lowest cost, lowest power dissipation, optimal use of the component placement or similar variables.

As described with respect to function 412 of FIG. 4 and related descriptions, after the assignment, the tool generates data for connection between matrix pads which represents the connections between components in the circuit 1401. As described with respect to steps 304 of FIG. 3 and related descriptions, the data may comprise a bond wire database which connects the appropriate matrix pads in the connection matrix and the die pads on any active device and any other components' pads to form the desired circuit 1401. As described with respect to steps 305 of FIG. 3 and related descriptions, the tool formats the bond wire database to a parsed database/netlist according to the required input specifications of the machine performing the actual bond wire placements. In some embodiments, the parsed database/netlist comprises the physical location and placement for each component, the routing of the signals from each component to the pads of the various connection matrices and the wire bond connections between the pads within each connection matrix.

Figure 15:
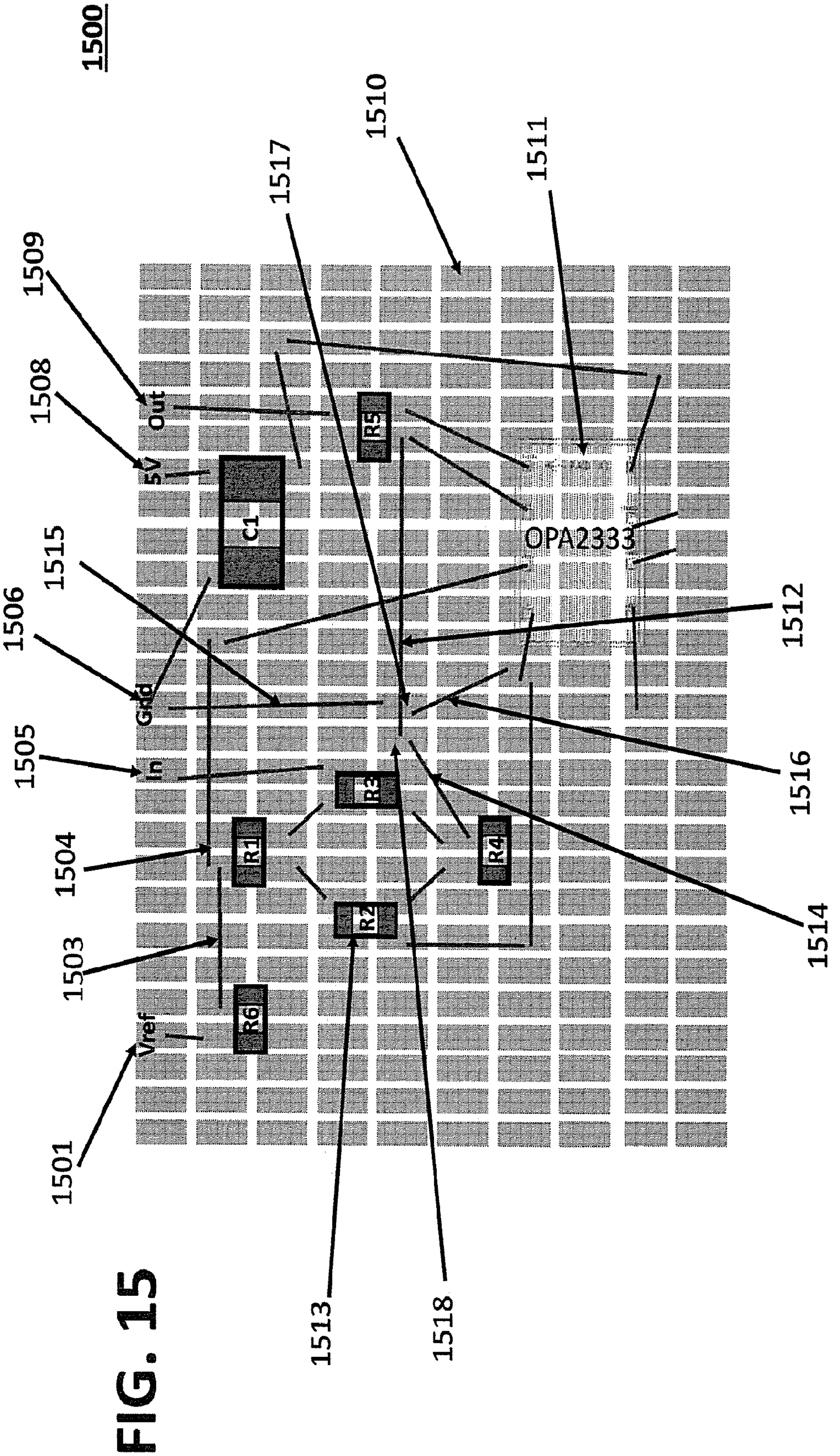
FIG. 15 is a diagram of a system according to some embodiments.

FIG. 15 illustrates the layout 1500 of the circuit 1401 of FIG. 14 on top of a substrate with a portion of its top surface populated with pads that make up a connection matrix. Accordingly, FIG. 15 depicts another example of a system implemented on a configurable substrate. In this matrix configuration, the connection matrix comprises an array of landing pads such as 1510.

In this example, the OpAmp 1511 is connected to the wheatstone bridge 1513 using bond wires. The bond wires such as 1503, 1504, 1512 and 1514 connect the circuit elements to each other. Bond wires are also used to connect the OpAmp 1511 to power 1501, 1508 and ground 1506. The wheatstone bridge 1513 is connected to input 1505 and the OpAmp Output is connected to 1509.

This layout pattern is another example of an output obtained from the design tool and method of the present disclosure. As described with respect to FIGS. 5-6, the flow diagrams of extraction of the component and interconnection data from the schematic/netlist, creation of the graph representation of the circuit, placement of the components on the substrate and determination of a wire bonding pattern as an input to the wire bonding machine. In some embodiments, the SiP layout information input described in FIG. 4 will be different from the input for matrix configuration described in FIGS. 2A-B. This difference in layout information will enable the design tool to make use of different optimization criteria to determine placement and routing for a custom circuit input as described in FIG. 15.

For the matrix configuration described in FIG. 15, the tool can place the active component anywhere on the matrix while adhering to design rules of the wire bonding machine. Accordingly, depending on the optimization criteria like minimizing wire bond length or optimal performance, the tool can generate different placement (pad-vertex assignment) and routing patterns.

For the example design tool described in FIG. 4, the matrix configuration in FIG. 15 may receive different layout information as an input that will result in change in layout initialization and pad assignment compared to the corresponding steps for matrix configuration in FIGS. 2A-B.

In some embodiments, the distance from one component to a second component may be too long for one bond wire and is then connected with two or more interconnected bond wires 1512, 1514 to an intermediate landing pad 1518. To avoid one bond wire from crossing over a second bond wire two intermediate landing pads 1517, 1518 can be used to allow each of the potentially overlapping bond wires to avoid such overlap. In this case, one of the longer bond wires is split in to two bond wires 1512, 1514 and are bonded to the intermediate landing pad 1518. Similarly, the other longer bond wire is split in to two bond wires 1515, 1516 and are bonded to another intermediate landing pad 1517. In some embodiments, other hardware methods such as zero ohm resistors and screened or printed insulators/conductors (for example, electronic ink) may be employed to accomplish the programming (making application specific circuits from a general circuit), or be used in addition to the use of bond wires to program the system on the substrate.

An alternative way a customizable SiP layout may be obtained, is to use a substrate with a single matrix with pads dispersed over its surface as depicted in FIG. 15 and that can accommodate both the active and passive components.

An example of generalized steps that outline the procedure for placement and routing for such a layout are described below in accordance with an embodiment.

First, place the active components of the circuit such that all the die pads are connected to matrix pads. This might involve aligning or rotating the components to adhere to the design rules and/or such that the die pads can be wire bonded to nearby pads on the matrix for electrical hookup to other components/inputs/outputs/power rails. If there are multiple active components, they should be placed such that there is enough space between them for placing other circuit components such as passive components and bond wires for routing.

Second, for each of the active component pad, calculate the placement of other components that are connected to it based on pre-specified optimization criteria such as importance of a signal or bond wire length. This step also might involve aligning and rotating components.

Third, calculate and place wire bond connections by going through each of the paths of the circuit to finish construction of the circuit in the substrate.

For final assembly of the integrated circuit, a machine may use the data base of the particular set of interconnections to install and place the components on their respective mapped die pad locations, connect the components (via bond wires) to associated respective component wire bond pads, and installs bond wires between the matrix pads determined by the previously determined mapped interconnections between the matrix pads.

Figure 16:
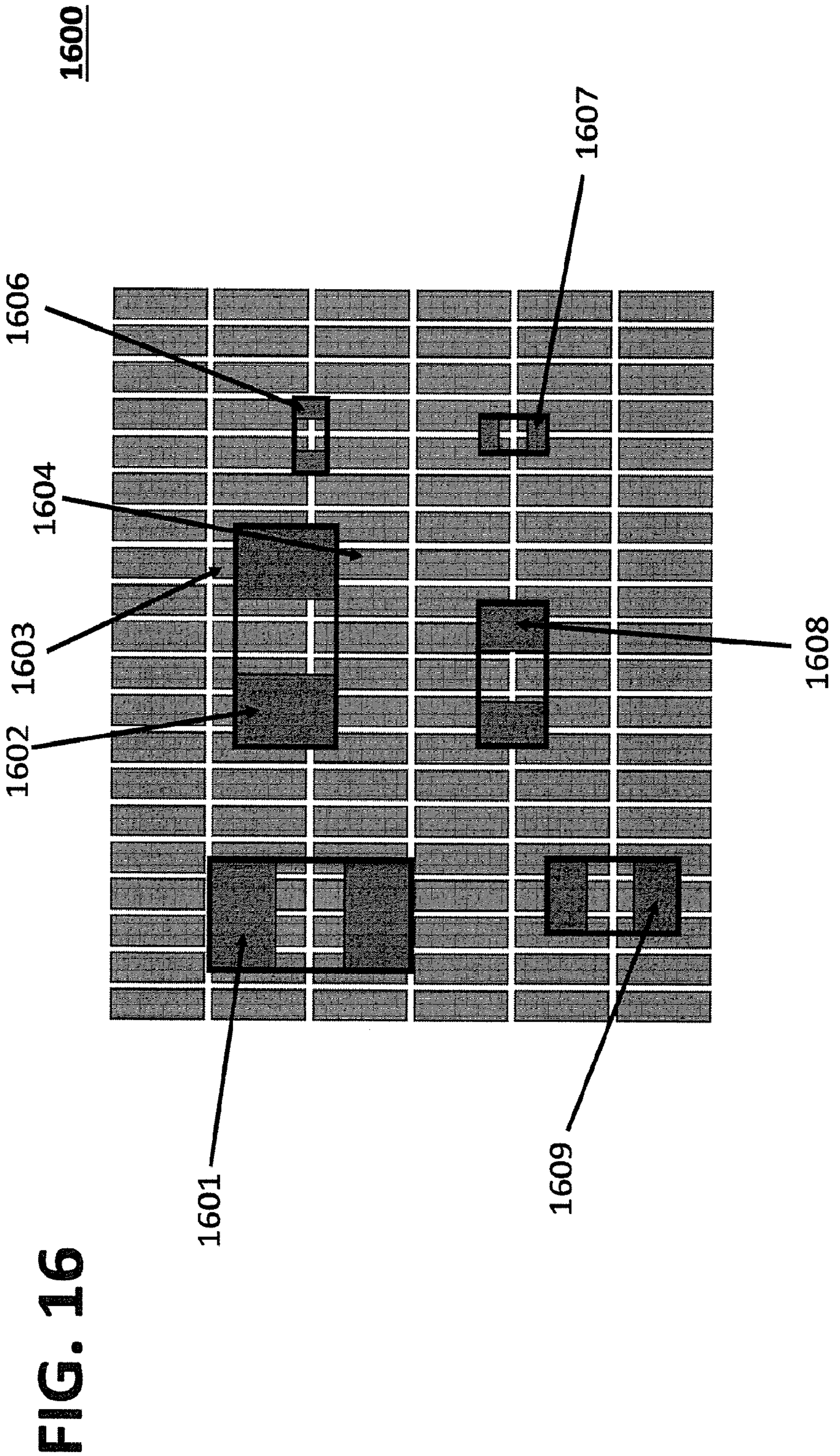
FIG. 16 is a diagram of a system according to some embodiments.

FIG. 16 illustrates how various sizes of Surface Mount Devices (SMD) devices can be placed on a connection matrix 1600 according to some embodiments. In this example, 0603 sized devices 1601 and 1602, 0402 sized devices 1608, 1609, and 0201 sized devices 1606 and 1607 are shown attached to the landing pads on the connection matrix such as 1603 and 1604 using solder paste. In this example, the 0603 horizontal device 1602 is not centered vertically on the landing pads to allow more space on one landing pad 1604 for wire bonds while allowing less space on another landing pad to which the device 1602 is attached.

Figure 17:
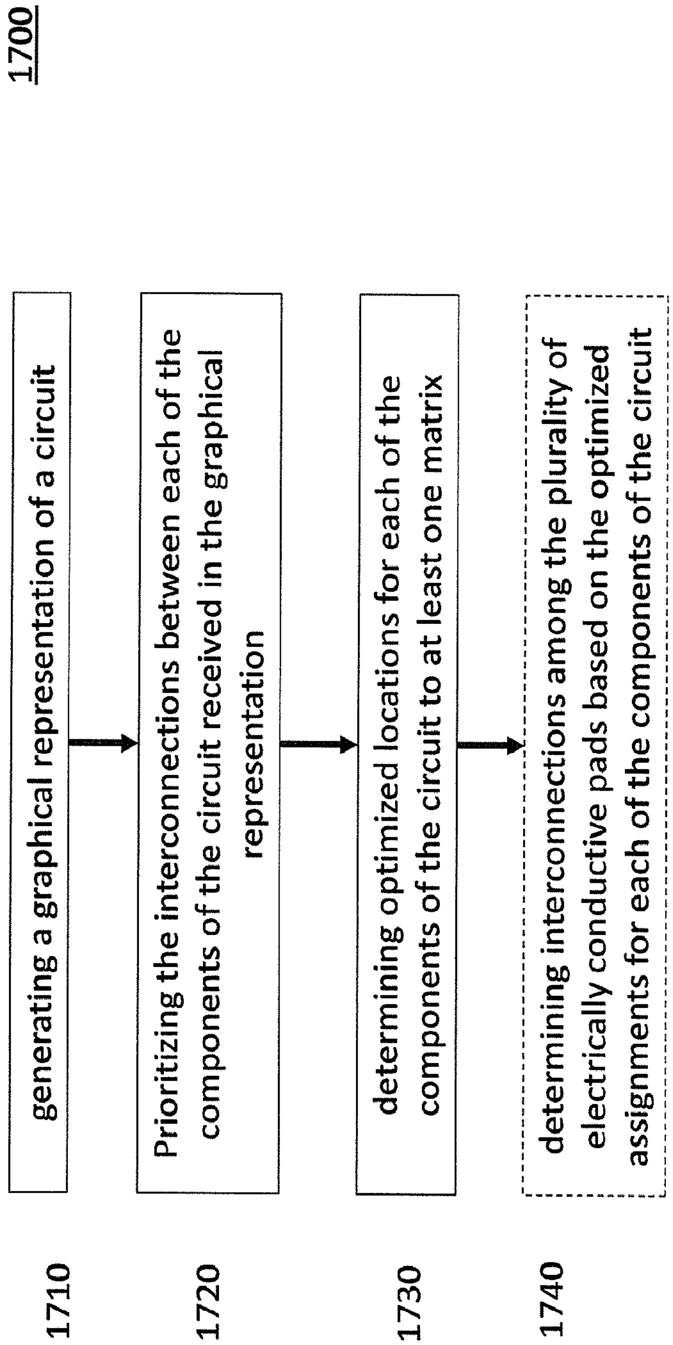
FIG. 17 is a flow chart illustrating a process according to some embodiments.

Referring now to FIG. 17, according to some embodiments, a process 1700 for locating components on a substrate is provided. The process may begin, for instance, with step 1710 in which a graphical representation of a circuit is generated, wherein the graphical representation comprises information indicating at least components of the circuit and interconnections between each of the components. The graphical representation of the circuit may be, for instance, the graph data type set forth in FIG. 5B. In some embodiments, the graphical representation may further comprise an indication of a priority for each of the interconnections. In step 1720, the interconnections between each of the components of the circuit received in the graphical representation may be prioritized. In step 1730, based on the prioritized interconnections, optimized connections for each of the components of the circuit to at least one matrix comprising a plurality of electrically conductive pads arranged to allow electrical interconnections between at least a first and second of the pads of the matrix may be determined, wherein each of the connections for each of the components of the circuit are assigned to an associated electrically conductive pad of the plurality of electrically conductive pads. In some embodiments, the process 1700 may proceed to step 1740 in which interconnections among the plurality of electrically conductive pads based on the optimized assignments for each of the components of the circuit are determined. In some embodiments, a database for the determined interconnections is generated. In some other embodiments, the generated database may be formatted in a format suitable for use by a machine configured to connect the determined interconnections with at least one of: wire bonds, zero ohm resistors, printed or screened insulator, and screened or printed conductors.

Figure 18:
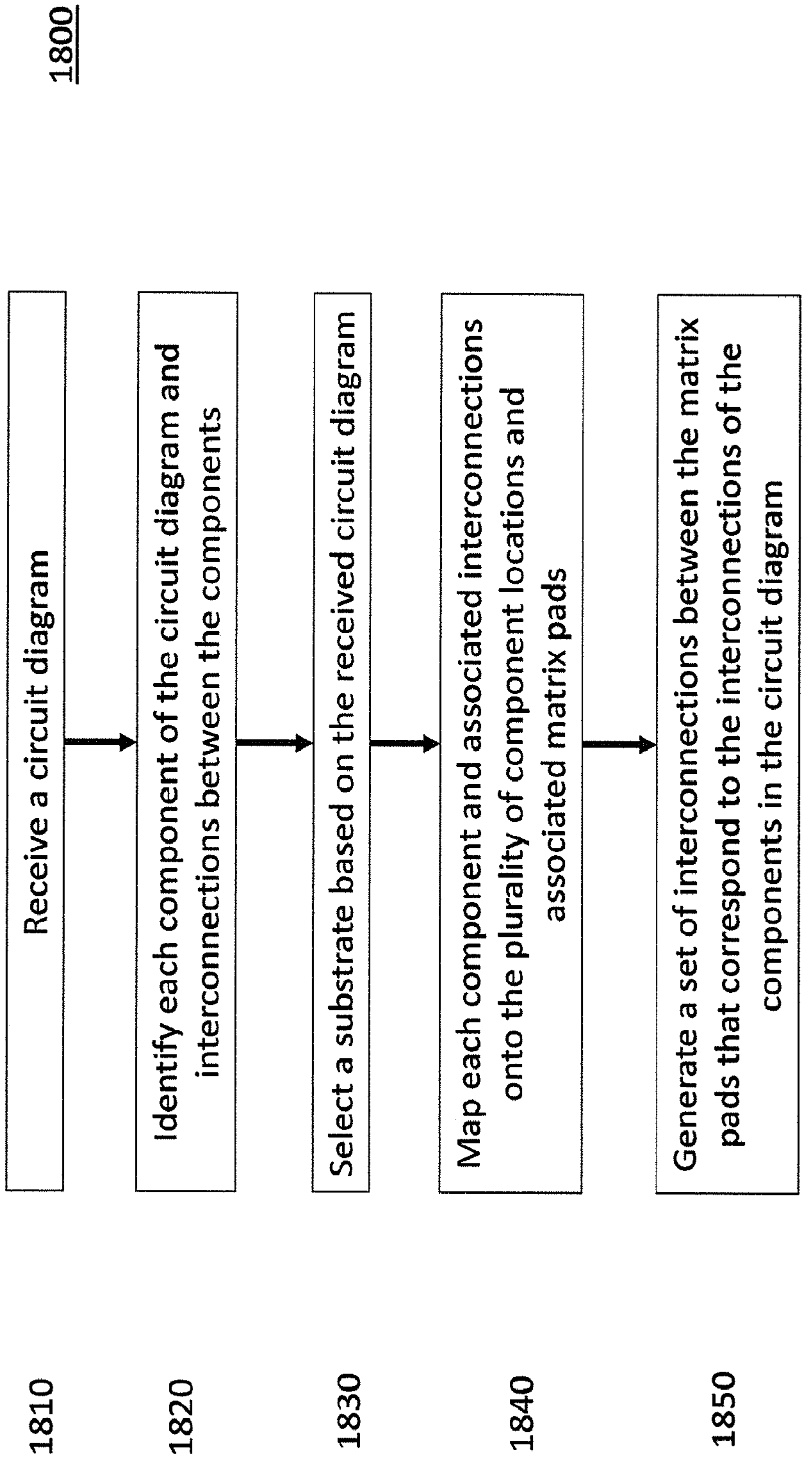
FIG. 18 is a flow chart illustrating a process according to some embodiments.

Referring now to FIG. 18, according to some embodiments, a process 1800 for designing a circuit or system is provided. The process may begin, for instance, with step 1810 in which a circuit diagram for an integrated circuit or system is received. The received circuit diagram may be, for example, the received circuit diagram set forth in any one of FIGS. 1, 2B, 7, 9B, and 14A-B. In step 1820, each component of the circuit diagram and the interconnections between components is identified. In step 1830, a substrate is selected based on the received circuit diagram. The substrate comprises a plurality of component locations with associated bond pads and at least one connection matrix with pads uniquely associated with the component bond pads. The substrate may be, for example, the substrate set forth in any one of FIGS. 1, 2A, 15, and 16. In step 1840, each component and associated interconnections are mapped onto the plurality of component locations and associated matrix pads. In step 1850, a set of interconnections between the matrix pads that correspond to the interconnections of the components in the circuit diagram is generated. In some embodiments, the generated set of interconnections is based on a particular set of interconnections between the matrix pads is determined, wherein the particular set of interconnection is based on one or more optimization criteria. The one or more optimization criteria may include, for example, minimizing interconnection distances, avoiding any overlapping of bond wire interconnections, optimizing use of the matrix pad locations nearest an active circuit component location, minimizing bond wire length, highest performance, minimizing usage of the bottom side of the substrate for component placement, minimizing bond wire sizes, optimizing for best overall power management, minimizing cost, minimizing power, selectively minimizing noise components, and minimizing component cross-talk. In some embodiments, the generated set of interconnections is formatted into a database suitable for use by a machine configured to connect the determined interconnections with at least one of: wire bonds, zero ohm resistors, printed or screened insulator, and screened or printed conductors. In some embodiments, the process 1800 proceeds to a further step in which the components are installed on the mapped component locations and the components are connected to associated component bond pads. In some embodiments, the process 1800 proceeds to a further step in which the matrix pads are connected based on the generated set of interconnections. The matrix pads may be connected based on the generated set of interconnections using, for example, at least one of: wire bonds, zero ohm resistors, printed or screened insulator, and screened or printed conductors.

Figure 19:
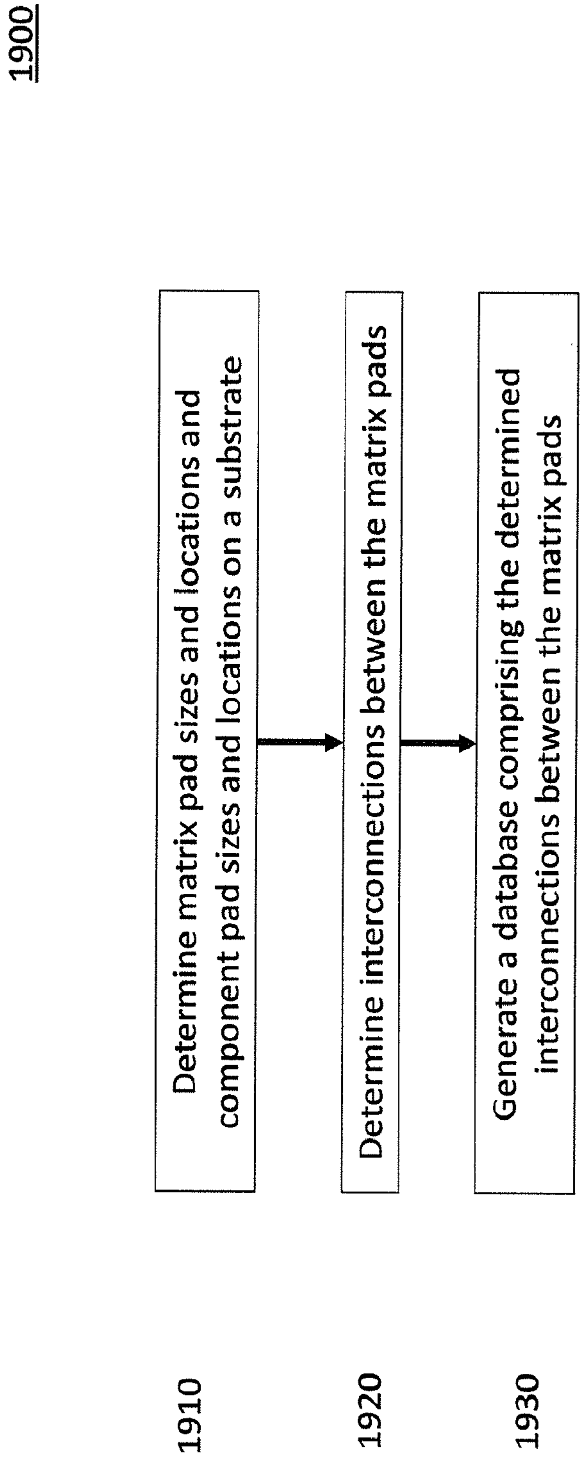
FIG. 19 is a flow chart illustrating a process according to some embodiments.

Referring now to FIG. 19, according to some embodiments, a process 1900 for determining wire bond interconnections for a circuit or system is provided. The process may begin, for instance, with step 1910 in which matrix pad sizes and locations and component pad sizes and locations on a substrate are determined, wherein the substrate comprises at least one matrix comprising a plurality of electrically conductive pads for interconnections between each of the components of the circuit or system. In step 1920, interconnections between the matrix pads are determined based on: (i) component connections to the matrix pads, (ii) component interconnections, and (iii) the determined matrix pad sizes and locations. In step 1930, a database comprising the determined interconnections between the matrix pads is determined. In some embodiments, the generated database is suitable for use by a machine configured to connect the determined interconnections with at least one of: wire bonds, zero ohm resistors, printed or screened insulator, and screened or printed conductors.

Figure 20:
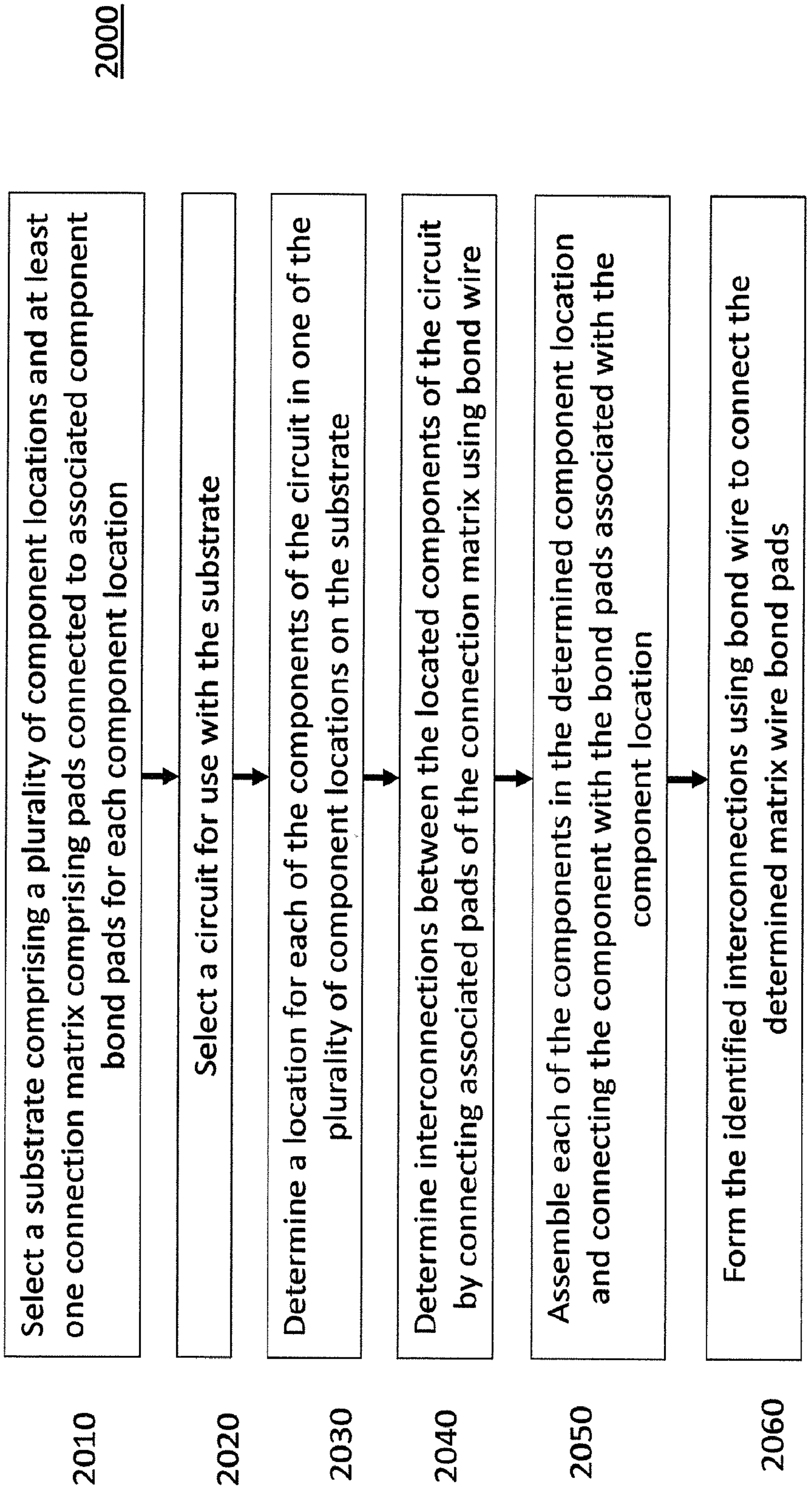
FIG. 20 is a flow chart illustrating a process according to some embodiments.

Referring now to FIG. 20, according to some embodiments, a process 2000 for forming wire bond interconnections for a circuit or system is provided. The process may begin, for instance, with step 2010 in which a substrate comprising a plurality of component locations and at least one connection matrix comprising pads connected to associated component bond pads for each component location is selected. In this instance, each component location comprises component bond pads which provide electrical connection to a component installed in the component location. The substrate may be, for example, the substrate set forth in any one of FIGS. 1, 2A, 15, and 16. In step 2020, circuit for use with the substrate is selected, wherein the circuit comprises identified components and interconnections between each of the components. In step 2030, a location for each of the components of the circuit in one of the plurality of component locations on the substrate is determined. In step 2040, interconnections between the located components of the circuit by connecting associated pads of the connection matrix using bond wire are determined. The bond wires may be used in connecting associated pads of the connection matrix as illustrated in, for example, FIG. 6C. In some embodiments, at least one or more of zero ohm resistors, printed or screen insulator, and screened or printed conductors may be used for the connection in addition to the bond wire. In step 2050, each of the components in the determined component location and connecting the component with the bond pads associated with the component location are assembled. In step 2060, the identified interconnections using bond wire to connect the determined matrix wire bond pads are formed.

Figure 21:
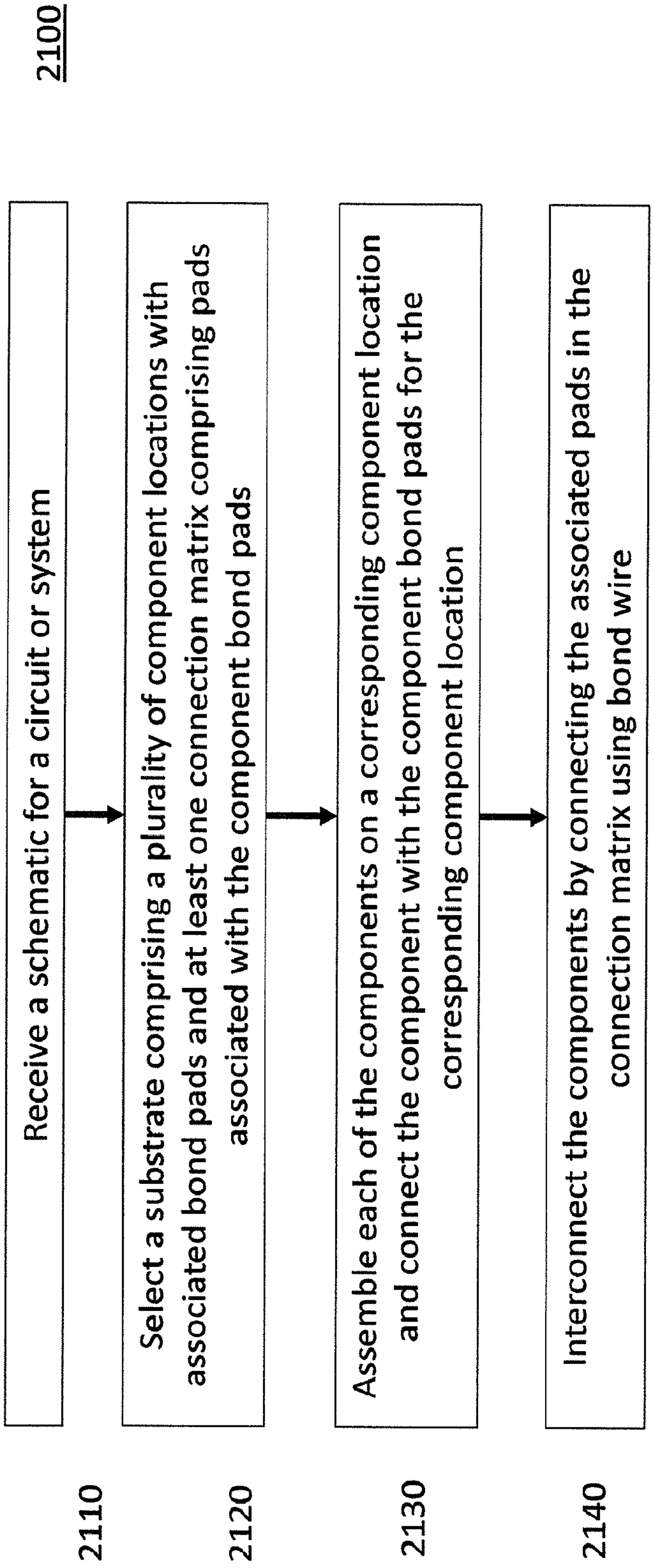
FIG. 21 is a flow chart illustrating a process according to some embodiments.

Referring now to FIG. 21, according to some embodiments, a process 2100 for assembling a circuit or system is provided. The process may begin, for instance, with step 2110 in which a schematic for a circuit or system is received. In this instance, the schematic comprises information regarding components and interconnections between each of the components of the circuit or system. The received schematic may be, for example, the schematic set forth in any one of FIGS. 1, 2B, 7, 9B, and 14A-B. In step 2120, a substrate is selected. In this instance, the substrate comprises a plurality of component locations with associated bond pads and at least one connection matrix comprising pads associated with the component bond pads. The substrate may be, for example, the substrate set forth in any one of FIGS. 1, 2A, 15, and 16. In step 2130, each of the components is assembled on a corresponding component location and connected with the component bond pads for the corresponding component location. In step 2140, the components are interconnected by connecting the associated pads in the connection matrix using bond wire.

Figure 22:
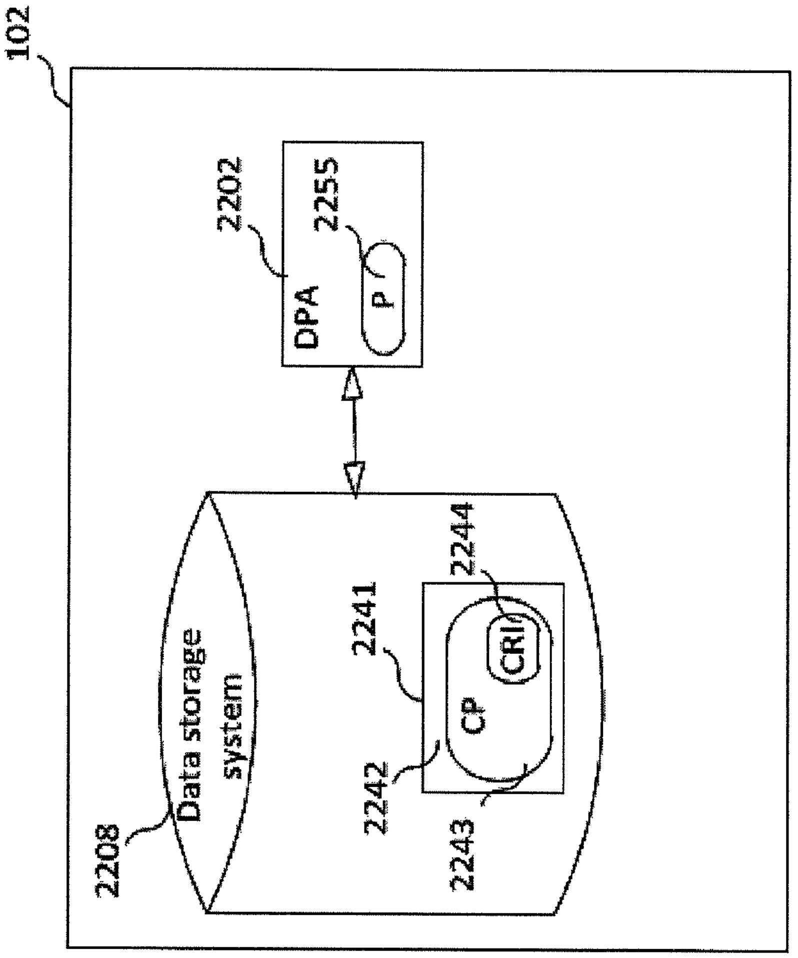
FIG. 22 is a block diagram of a design tool according to some embodiments.

FIG. 22 is a block diagram of design tool 102 according to some embodiments. As shown in FIG. 22, design tool 102 may comprise: a data processing apparatus (DPA) 2202, which may include one or more processors (P) 2255 (e.g., a general purpose microprocessor and/or one or more other processors, such as an application specific integrated circuit (ASIC), field-programmable gate arrays (FPGAs), and the like); and local storage unit (a.k.a., "data storage system") 2208, which may include one or more non-volatile storage devices and/or one or more volatile storage devices (e.g., random access memory (RAM)). In embodiments where device 102 includes a general purpose microprocessor, a computer program product (CPP) 2241 may be provided. CPP 2241 includes a computer readable medium (CRM) 2242 storing a computer program (CP) 2243 comprising computer readable instructions (CRI) 2244. In some embodiments, the CPP 2241 may comprise CRI 2244 such as the functions 414, 415, and 416, as described in FIG. 4. CRM 2242 may be a non-transitory computer readable medium, such as, but not limited, to magnetic media (e.g., a hard disk), optical media, memory devices (e.g., random access memory), and the like. In some embodiments, the CRI 2244 of computer program 2243 is configured such that when executed by data processing apparatus 2202, the CRI causes device 102 to perform steps described above (e.g., steps described above with reference to the flow charts). In some embodiments, the CRI 2244 of the computer program is configured such that when executed by data processing apparatus 2202, the CRI causes device 102 to perform the functions as described above in FIG. 4 and related descriptions. In other embodiments, device 102 may be configured to perform steps described herein without the need for code. That is, for example, data processing apparatus 2202 may include one or more ASICs. Hence, the features of the embodiments described herein may be implemented in hardware and/or software.

Figure 23:
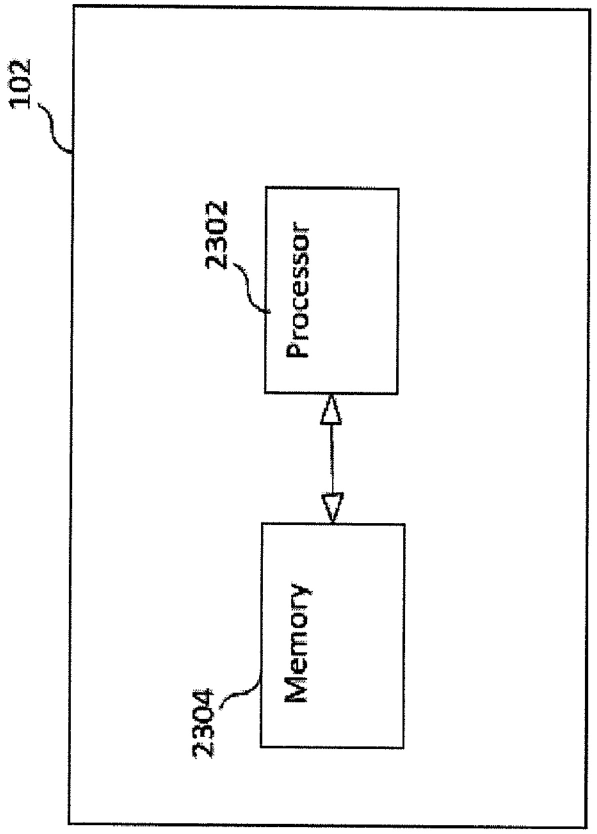
FIG. 23 is a block diagram of a design tool according to some embodiments.

FIG. 23 is a block diagram of design tool 102 according to some embodiments. As shown in FIG. 23, design tool 102 may comprise: a processor 2302 (e.g., a general purpose microprocessor and/or one or more other processors, such as an application specific integrated circuit (ASIC), field-programmable gate arrays (FPGAs), and the like); and a memory 2304, which may include one or more non-volatile storage devices and/or one or more volatile storage devices (e.g., random access memory (RAM)). In some embodiments, the processor 2302 may comprise one or more processors. In some embodiments, the processor 2302 is coupled to the memory 2304 and configured to perform steps described above (e.g., steps described above with reference to the flow charts). In some embodiments, the processor 2302 is coupled to the memory 2304 and configured to perform the functions as described above in FIG. 4 and related descriptions.

According to embodiments, the design tool and methods of the present disclosure can be used to translate or convert a desired circuit into a database used as instructions for a wire bond machine to place bond wires on the connection matrix (or matrices) of the substrate to create the desired programmable circuit. The design tool and methods of the present disclosure may use a substrate used for a family of products has a matrix of pads for programmable component interconnections ("connection matrix"). For the configurable substrate to be made into a user specified product, the connection matrix will require a method to translate the specified product circuit required by a user to a database that serves as an input to the manufacturing phase of the SiP. In the manufacturing phase, the pads of the connection matrix are populated with bond wires based on that database. An embodiment of a connection matrix and bond wire connections 104 is shown in FIG. 1; another embodiment for a different type of matrix is depicted in FIG. 15.

In certain aspects, the present disclosure provides a method for automating the routing process for bond-wire connections of a circuit of a customizable SiP from a family of similar systems using a generic substrate having at least one connection matrix. This can avoid the expense and time delay of fabricating a unique custom substrate for each given design in a family. For instance, R&D facilities can use this for rapid prototyping. Assembly providers can use a small set of such generic substrates as stock items and provide assembly for a wide variety of SIP requirements. Embodiments may be particularly beneficial where a manufacturer has several similar designs with a limited number of interconnections that are different for each design. In such cases the needed pads can be left open for subsequent connections as required by a specific design.

In some aspects, the present disclosure provides a method for designing an integrated circuit or system by providing a circuit diagram for the desired integrated circuit or system, identifying each component of the circuit diagram and listing the interconnections between components, providing a substrate on which the circuit is to be fabricated having multiple component locations with associated bond pads and having a connection matrix with pads uniquely associated with the component bond pads, mapping each component and its interconnections onto the substrate locations and its resulting matrix pads, generating a set of interconnections between the matrix pads that correspond to the interconnections of the components in the circuit diagram, and outputting the generated set of interconnections into a data base suitable for use in a machine for making the interconnections using wire bonds. It should be noted that other hardware methods such as zero ohm resistors and screened or printed insulators/conductors (for example, electronic ink) may be employed to accomplish the programming, or be used in addition to the use of bond wires to program the system on the substrate.

In certain aspects, the present disclosure also provides a method for assembling an integrated circuit or system, by providing a circuit diagram/schematic having known preselected components with known interconnections for a desired integrated circuit or system, providing a substrate having multiple component locations with associated bond pads and a connection matrix having pads uniquely associated with said component bond pads on which the circuit is to be fabricated, assembling each of said components on its component location and connecting said component with the component bond pads of said component location, and interconnecting said components using said pads of said matrix using bond wire.

While the present disclosure has been described with respect to the embodiments set forth above, the present disclosure is not limited to these embodiments. Accordingly, other embodiments, variations, and improvements not described herein are not excluded from the scope of the present disclosure. Such variations include but are not limited to new substrate material, different kinds of devices attached to the substrate not discussed, or new packaging concepts.

What is claimed is:

1. A device, comprising:

a memory; and a processor coupled to said memory, said processer configured to:

receive information regarding a circuit, wherein said information comprises at least the components of said circuit and interconnections between said components, receive layout information for a substrate, wherein said information for said substrate comprises a plurality of component locations and at least one connection matrix comprising a plurality of electrically conductive pads arranged to allow electrical interconnections between at least a first and second of the pads of the at least one connection matrix, select a component location on a surface of said substrate for each of said components of said circuit, wherein a plurality of said component locations on said substrate comprise electrically conductive component connectors that are each individually associated with and connected to one or more pads of said plurality of electrically conductive pads, and select connections for said components of said circuit to said component connectors and determine interconnections between said components in accordance with said circuit using the associated plurality of electrically conductive pads.

2. The device of claim 1, wherein said processor is further configured to:

generate a graphical representation of said circuit based on at least said received information regarding said circuit and said received layout information for said substrate.

3. The device of claim 2, wherein said processor is further configured to:

determine the connections and interconnections for said components based on said graphical representation of said circuit.

4. The device of claim 1, wherein said processor is further configured to:

list said component locations, said component connections, said component interconnections, and associated pads in the at least one connection matrix in a format suitable for use in a semiconductor assembly line.

5. The device of claim 1, wherein said processor is further configured to:

Output said determined connections in a format suitable for use by a machine in a semiconductor assembly line configured to connect said determined connections with at least one of: wire bonds, zero ohm resistors, printed or screened insulator, and screened or printed conductors.

6. The device of claim 1, wherein said information regarding said circuit comprises at least one of a schematic file, a netlist file, and a circuit diagram, and wherein said layout information comprises: active and passive component locations on said substrate, centralized and distributed matrix pad locations, pad interconnections, and substrate connections between substrate layers, and die pad information for active components of said circuit.

7. The device of claim 1, wherein said interconnections for said components are determined based on an optimization algorithm using one or more optimization criteria.

8. The device of claim 7, wherein the optimization criteria comprises at least one or more of:

minimizing interconnection distances, avoiding any overlapping of bond wire interconnections, optimizing use of the matrix pad locations nearest an active circuit component location, minimizing bond wire length, highest performance, minimizing usage of the bottom side of the substrate for component placement, minimizing bond wire sizes, optimizing for best overall power management, minimizing cost, minimizing power, selectively minimizing noise components, and minimizing component cross-talk.

9. The device of claim 1, wherein said substrate further comprises a second connection matrix comprising pads associated with component connectors, and wherein said processor is further configured to:

determine interconnections for each of said components using at least a portion of the pads of said second connection matrix.

10. A method for converting a SiP system design into a SiP hardware design, or for assembling a SiP, comprising:

A) in a method for converting a SiP design into a SiP hardware design, the following steps:

receiving a circuit diagram for said SiP system;

identifying each component of said SiP system circuit diagram and the interconnections between components;

selecting a substrate based on said received SiP system circuit diagram, wherein said substrate comprises a plurality of component locations with associated connector pads and at least one connection matrix with pads uniquely associated with each of said component connector pads;

mapping each component and associated interconnections onto the plurality of component locations and associated matrix pads; and generating a set of interconnections between said matrix pads that correspond to said interconnections of said components in said SiP system circuit diagram, or B) in a method for assembling a SiP, the following steps:

receiving a schematic for a SiP, wherein the schematic comprises information regarding components and interconnections between each of the components of the circuit or system;

selecting a substrate comprising a plurality of component locations with associated bond pads and at least one connection matrix comprising pads associated with the component bond and connector pads;

assembling each of the components on a corresponding component location and connecting the component with the component bond and connector pads for the corresponding component location; and interconnecting the components by connecting the associated pads in the connection matrix using bond wire.

11. The method of claim 10, wherein the method further comprises:

formatting the generated set of interconnections into a database suitable for use by a semiconductor assembly line machine configured to make the determined interconnections with at least one of: wire bonds, zero ohm resistors, printed or screened insulator, and screened or printed conductors.

12. The method of claim 10, wherein the method further comprises:

creating instructions for a semiconductor assembly line machine configured for installing the components on the mapped component locations of said substrate and connecting the components to associated component bond pads; and connecting the matrix pads based on the generated set of interconnections.

13. The method of claim 12, wherein the matrix pads are connected based on the generated set of interconnections using at least one of: wire bonds, zero ohm resistors, printed or screened insulator, and screened or printed conductors.

14. The method of claim 10, wherein the step of generating the set of interconnections further comprises:

determining a particular set of interconnections between the matrix pads based on one or more optimization criteria.

15. The method of claim 14, wherein the optimization criteria comprises at least one or more of:

minimizing interconnection distances, avoiding any overlapping of bond wire interconnections, optimizing use of the matrix pad locations nearest an active circuit component location, minimizing bond wire length, highest performance, minimizing usage of the bottom side of the substrate for component placement, minimizing bond wire sizes, optimizing for best overall power management, minimizing cost, minimizing power, selectively minimizing noise components, and minimizing component cross-talk.

16. The method of claim 10, further comprising:

determining matrix pad sizes and locations and component pad sizes and locations on a substrate, wherein the substrate comprises at least one matrix comprising a plurality of electrically conductive pads for interconnections between each of the components of the circuit or system;

determining interconnections between the matrix pads based on: (i) component connections to the matrix pads, (ii) component interconnections, and (iii) the determined matrix pad sizes and locations; and generating a database comprising the determined interconnections between the matrix pads.

17. The method of claim 16, wherein the generated database is suitable for use by a machine configured to connect the determined interconnections with at least one of: wire bonds, zero ohm resistors, printed or screened insulator, and screened or printed conductors.

18. A device comprising: a data storage system;

a data processing apparatus comprising a processor, wherein said data processing apparatus is coupled to said data storage system, said data processing apparatus configured to:

receive a circuit schematic comprising information regarding components and interconnections between each components for said circuit;

receive information regarding a substrate, wherein said substrate comprises a plurality of component locations with associated bond and connector pads and a connection matrix comprising pads associated with said component bond and connector pads;

identify a component location on said substrate for each of said components of the said circuit;

determine connections for each of said components with said component bond and connector pads of each associated component location; and determine the interconnections for each of said components using said pads of said connection matrix.

19. The device of claim 18, said data processing apparatus further configured to:

output said determined interconnections in a format suitable for use by a machine configured to connect the determined interconnections with at least one of: wire bonds, zero ohm resistors, printed or screened insulator, and screened or printed conductors.

20. The device of claim 18, wherein said substrate further comprises a second connection matrix comprising pads associated with the component bond pads, and wherein said data processing apparatus is further configured to:

determine a plurality of interconnections for each of said components using said pads of said second connection matrix.

* * * * *